March 13, 1956 P. CRAWFORD, JR 2,737,883

HIGH SPEED HIGH QUALITY PRINTER

Filed June 29, 1954 10 Sheets-Sheet 1

INVENTOR.
PERRY CRAWFORD, JR.
BY Jesse A. Holton
ATTORNEY

HIGH SPEED HIGH QUALITY PRINTER

INVENTOR.
PERRY CRAWFORD, JR.
BY Jesse A. Holton
ATTORNEY

INVENTOR.
PERRY CRAWFORD, JR.
BY Jesse A. Holton
ATTORNEY

Fig. 5
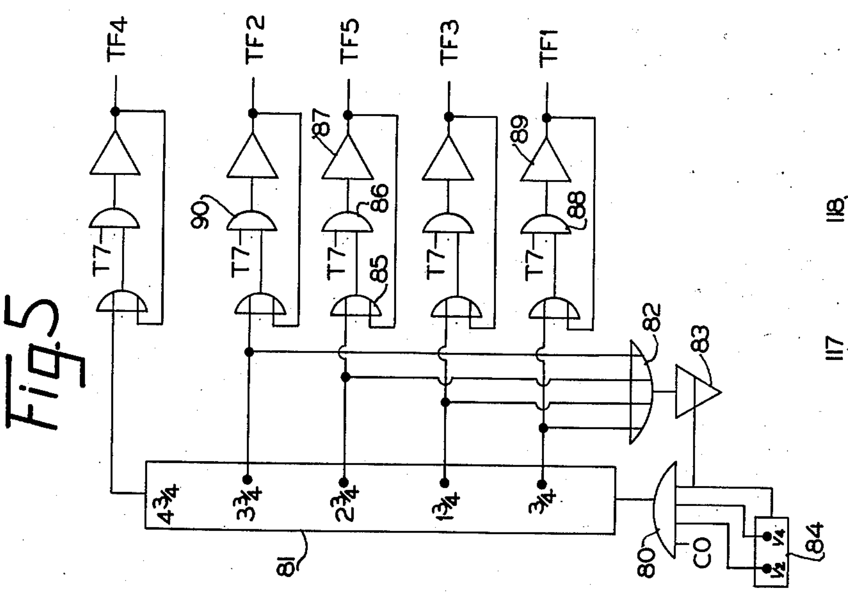
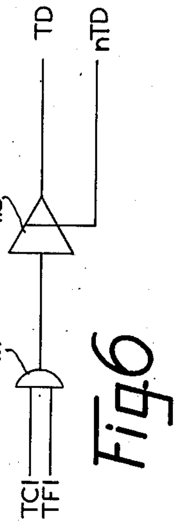
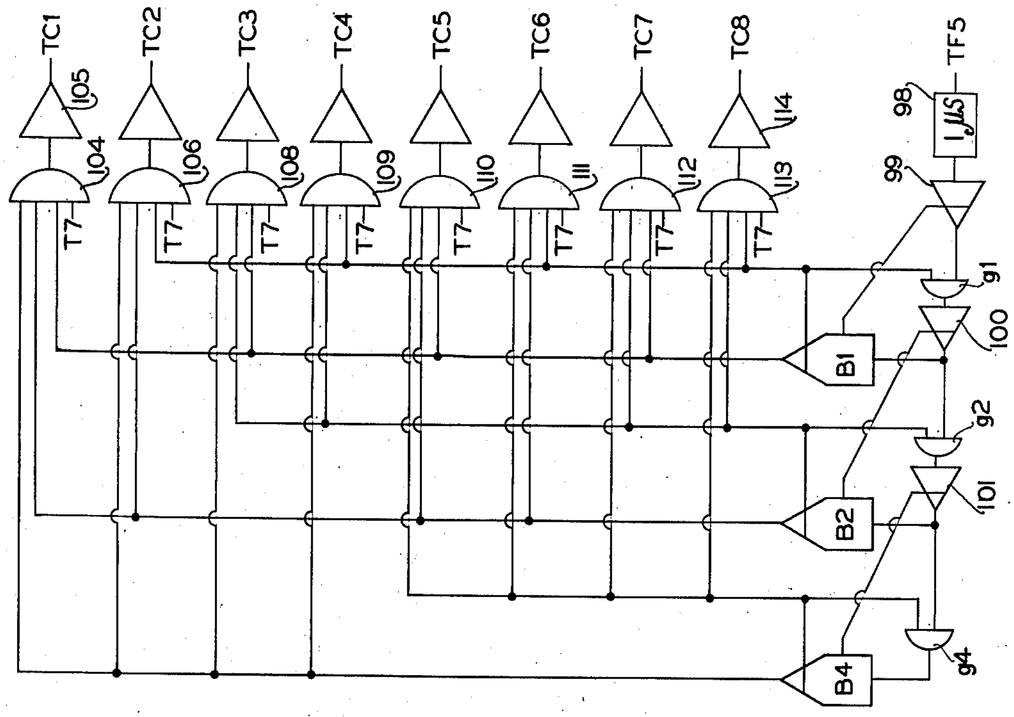
Fig. 4
INVENTOR.
PERRY CRAWFORD, JR.
BY Jesse A. Holton
ATTORNEY March 13, 1956 P. CRAWFORD, JR 2,737,883

HIGH SPEED HIGH QUALITY PRINTER

Filed June 29, 1954 10 Sheets-Sheet 5

INVENTOR.
PERRY CRAWFORD, JR.
BY Jesse A. Holton
ATTORNEY

INVENTOR.
PERRY CRAWFORD, JR.
BY Jesse A. Holton
ATTORNEY

HIGH SPEED HIGH QUALITY PRINTER

Filed June 29, 1954 10 Sheets-Sheet 7

INVENTOR.
PERRY CRAWFORD, JR.

BY Jesse A. Holton

ATTORNEY

HIGH SPEED HIGH QUALITY PRINTER

Filed June 29, 1954 10 Sheets-Sheet 8

INVENTOR.
PERRY CRAWFORD, JR

BY Jesse A. Holton

ATTORNEY

March 13, 1956 P. CRAWFORD, JR 2,737,883

HIGH SPEED HIGH QUALITY PRINTER

Filed June 29, 1954 10 Sheets-Sheet 9

INVENTOR.
PERRY CRAWFORD, JR

BY Jesse A. Holton

ATTORNEY

INVENTOR.
PERRY CRAWFORD, JR.
BY Jesse A. Holton
ATTORNEY 2,737,883

HIGH SPEED HIGH QUALITY PRINTER

Perry Crawford, Jr., Croton-on-Hudson, N. Y., assignor to Underwood Corporation, New York, N. Y., a corporation of Delaware Application June 29, 1954, Serial No. 440,017

10 Claims. (Cl. 101—93)

This invention relates to a high speed printer of the kind generally using type-wheels carrying a multiplicity of characters for printing, although, strictly speaking, conventional type "wheels" are not used in this invention, but rather, continuous rings, belts, or bands on which the type faces are carried. The present printer, by using a multiplicity of type bands or rings, is designed for printing an entire line of alphabetical or numerical characters on a page at one time. However, as will be clear from the detailed explanation and claims herein, certain aspects of the mechanism are applicable to single type rings or bands.

According to the exemplary embodiment illustrated and described here, the present printer may print at a speed of 10 lines of characters per second, with a reasonable number of characters in a line, limited to a degree by the timing cycle used and by the multiplication of type bands desired. In the present machine, a line of 40 characters in length is chosen. More or less than this number may be found desirable. The 40 character line length and the 10 lines per second make the present printer capable of printing 400 characters per second, and accomplishes one of the prime objects of this invention, namely, to provide a printer useful as an output unit for high-speed data processing equipment, for electronic computers, and for similar devices.

High speed, multiple type-wheel printers are known, in which a plurality of characters in a line are printed at approximately the same time, but due to the nature of the mechanisms used, a line of information printed by these known devices may not have all the characters accurately horizontally aligned across a page. Such misalignment results in a printed product of inferior appearance which may at times lead to a misinterpretation of the printed data. Many available high speed printers today also are incapable of producing sharp and clear carbon copies of the printed matter.

Further objects of the present invention, therefore, are to provide a high speed line printer in which the printed characters in a line are all accurately horizontally aligned and to provide such a printer in which several good quality carbon copies may be produced simultaneously with the original printed copy.

Additional objects are to construct a high quality printer having the requirements noted above, which will be low in manufacturing and operating costs and capable of high operating speeds, compared to printers having otherwise similar performance characteristics.

These objects and others are met, according to the illustrated embodiment of the present invention, through the use of a plurality of type-carrying bands or rings, each being of relatively small mass compared to conventional type wheels. As many bands are used as there will be character positions along a line to be printed, and each band will carry a complete set of symbols or font of type to be printed, such as an alphabet, or a set of numbers, or other desired characters. The type bands will be rotatably driven at high speed around a support or backing member, but mechanism is provided for stopping or arresting each band at a particular desired position generally opposite a printing station, preparatory to printing. After all of the bands have been arrested, a single means is provided for positively and accurately aligning the selected type on all of the bands horizontally at the printing station, after which alignment the printing impression is made simultaneously from all the aligned bands onto a sheet or web of paper or similar printing surface. After printing one line, the bands are allowed to rotate again and the printing paper will be advanced to the next line space preparatory to setting up and printing again in the cycle above described. Each printing cycle for a complete line occupies one tenth of a second in time, to print 10 lines per second. In order to develop the high speed of operation desired, electronically operated mechanisms are provided for arresting and releasing the bands, for driving the paper web and otherwise controlling the machine. Clarity of carbon copies is achieved because of the accurate type alignment, because each type band position is provided with individual striking mechanism which will adjust itself to the particular character being printed, and because the type faces on the bands are all stationary at the time of printing, minimizing streaking or smudging of impressions made for the type.

The above objects and advantages, and auxiliary purposes and benefits of this invention, will be clear from the detailed description which follows, taken with the accompanying drawings forming a part of this disclosure, which description and drawings set forth one example of a printer according to this invention, together with one kind of suitable electronic control system for the printer.

In the drawings:

Figure 1 is a transverse sectional view of a printer according to this invention, certain parts being indicated schematically;

Figure 1*a* is a sectional view like a portion of Figure 1, but with parts in their printing positions.

Figure 2 is a layout of one of the type bands of the printer of Figure 1;

Figure 2*a* is a perspective view of the type alignment bail with its actuating solenoids;

Figure 3 is a diagram showing a generator for basic electronic clock pulses used in timing operations of the printer;

Figure 3*a* is a diagram showing a generator for the eight pulses in a minor cycle of the printer, used in representing a single character;

Figure 4 is a diagram showing a generator for coarse timing (TC) pulses used to help locate minor cycles or characters in the printer;

Figure 5 is a diagram showing a generator for fine timing (TF) pulses used in combinations with the coarse timing pulses to locate minor cycles or characters in the printer;

Figure 6 is a diagram showing a generator for the starting (TD) pulses in the printer;

Figure 8A:
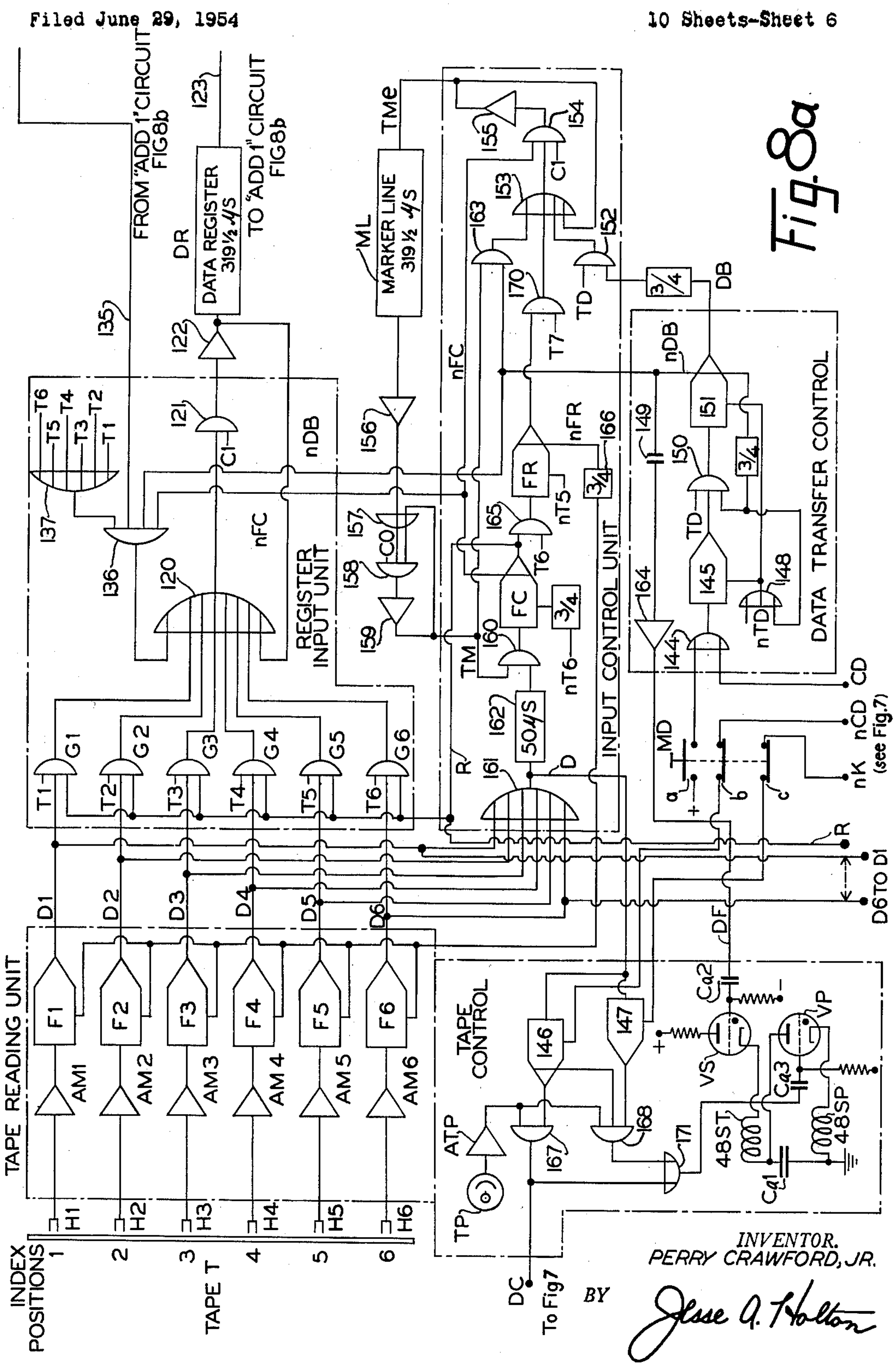
Figure 8B:
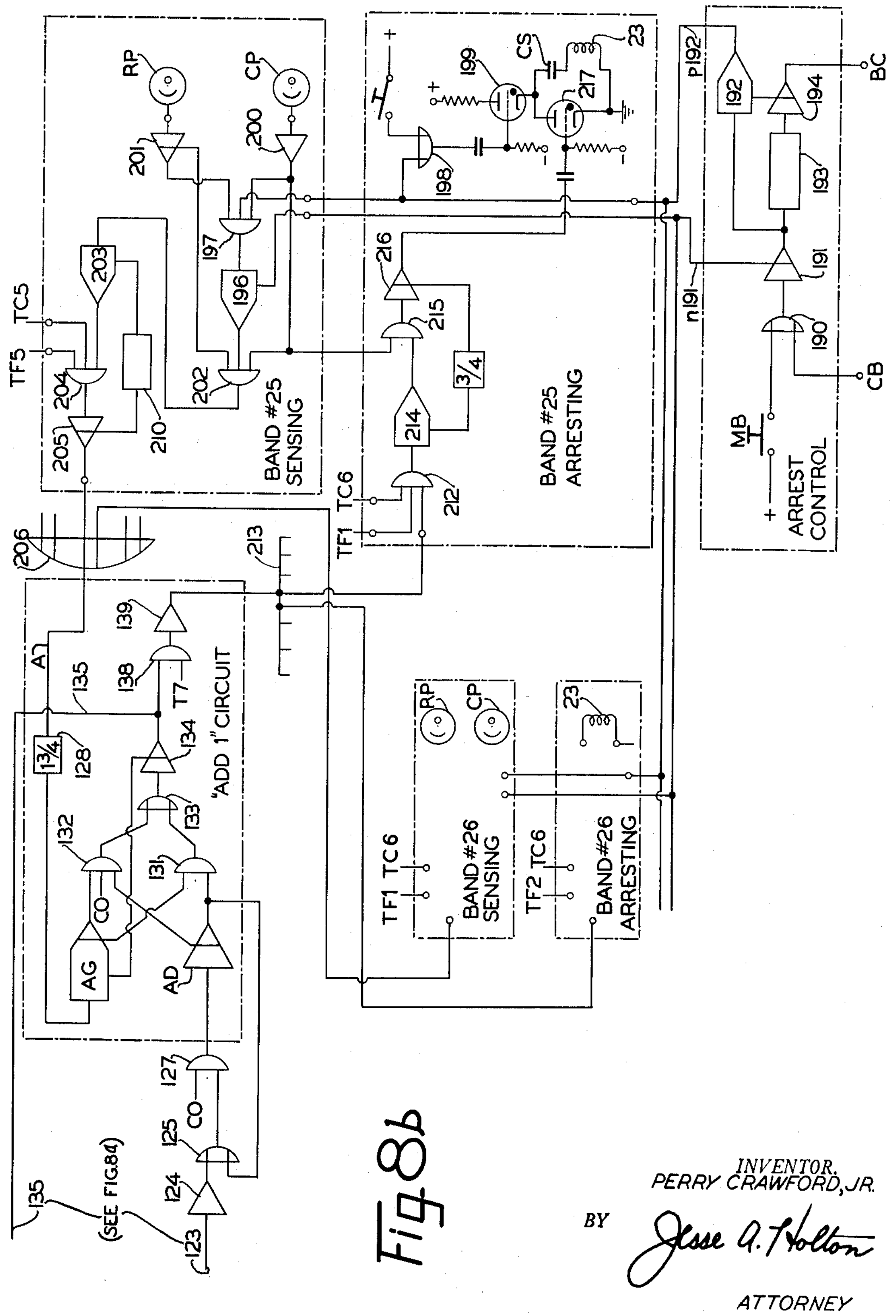
Figures 9, 10, 11, 12, 13, 14, 16, 17:
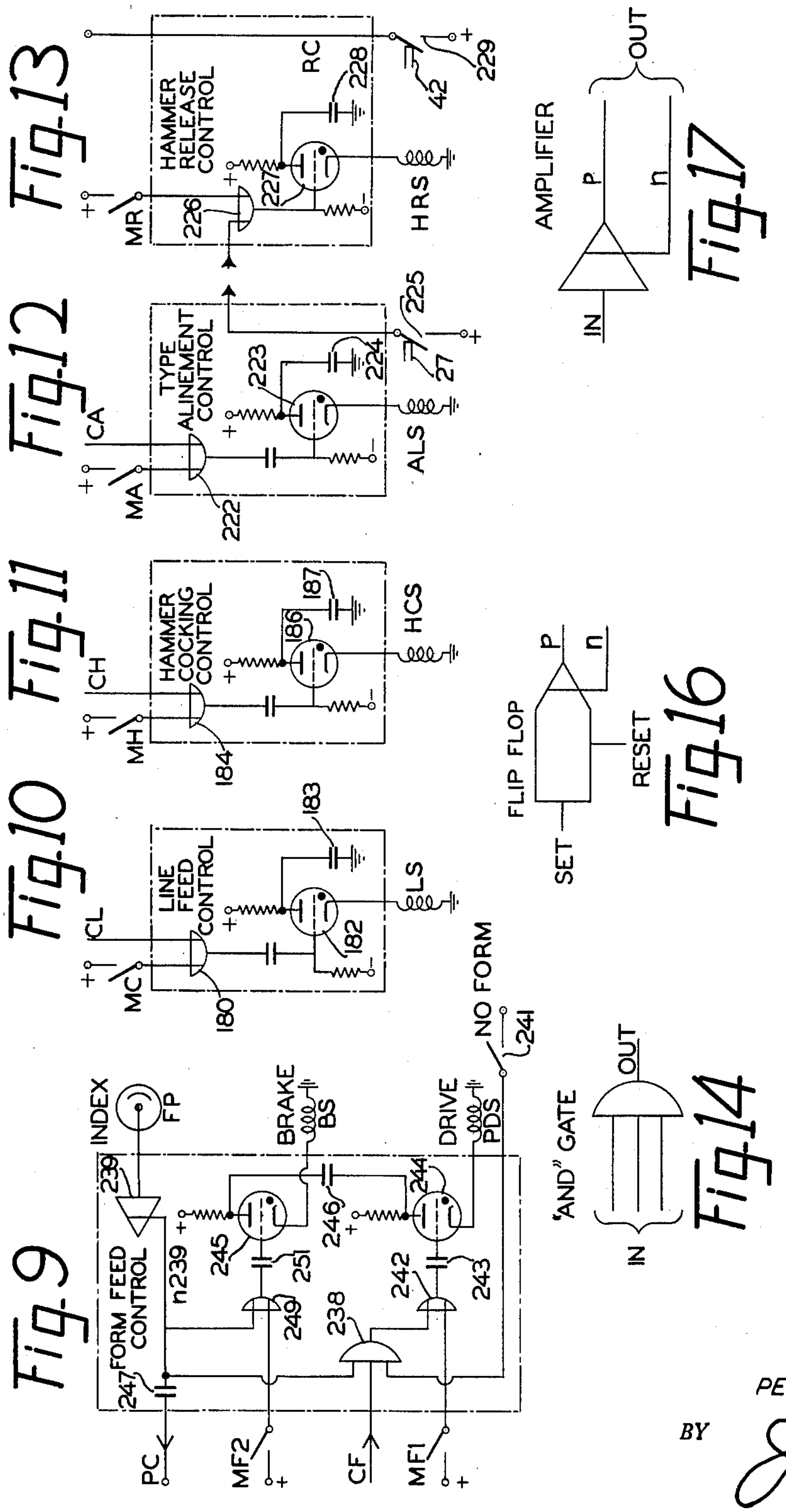
Figures 15, 18:
Figure 19:
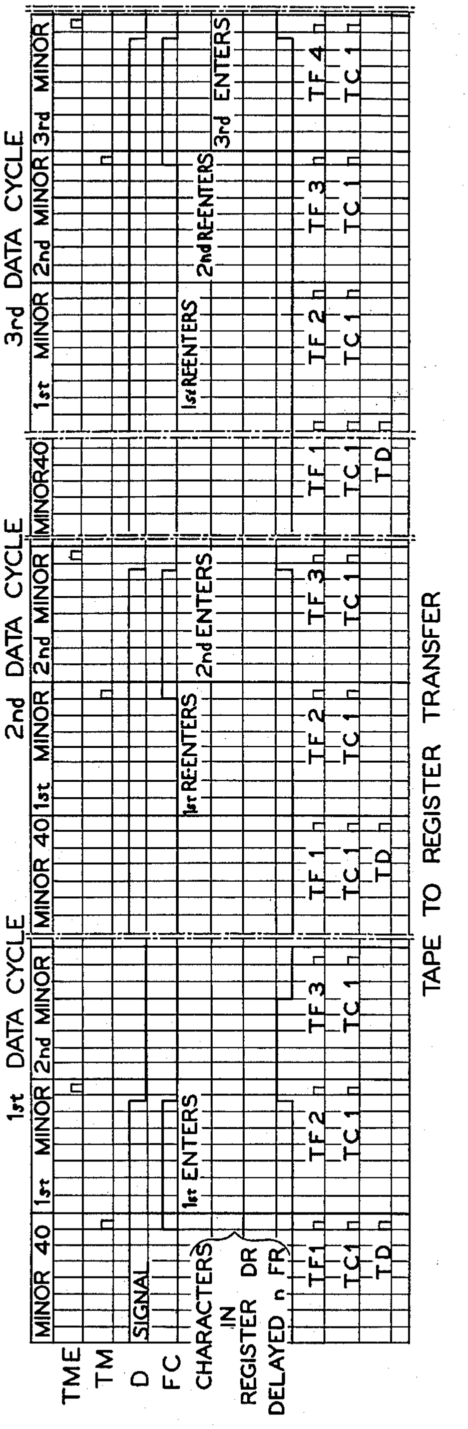
Figure 20:
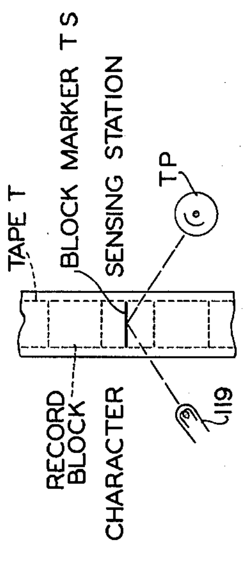
Figure 21:
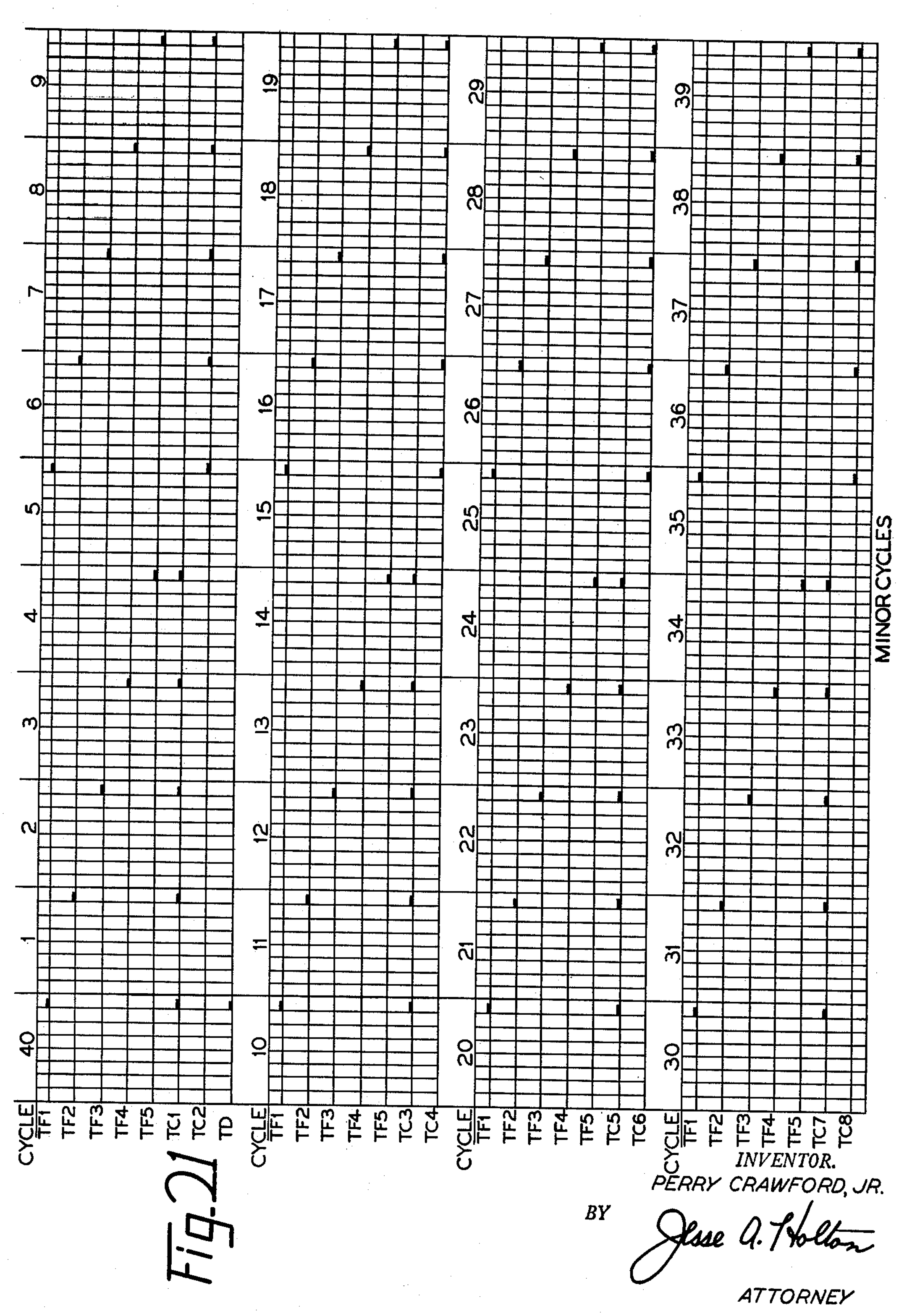

Figure 8*a* is a diagram showing the tape reading unit, the register, the tape control unit, the data register, the tape input control unit with its marker line, the data transfer control, and interconnections between these units together with connections leading to other parts of the machine;

Figure 8*b* is a continuation of the diagram of Figure 8*a* but showing the "add 1" circuit, typical type band sensing and band arresting units and the arrest control unit;

Figure 9 is a diagram showing details of the form feed control unit;

Figure 10 is a diagram showing details of the line feed control unit;

Figure 11 is a diagram showing details of the hammer cocking control unit;

Figure 12 is a diagram showing details of the type alignment control unit;

Figure 13 is a diagram showing details of the hammer release control unit, which is closely associated with the type alignment control;

Figure 14 is a diagram showing a conventional symbol for a coincidence gate, or "and" gate, used in control circuits for the printer;

Figure 15 is a similar diagram showing a conventional symbol for a buffer, or "or" gate;

Figure 16 is a diagram showing a conventional symbol for a flip-flop, typical of those used with the printer;

Figure 17 is a symbolic representation of a conventional amplifier;

Figure 18 is the symbol used in indicating a conventional delay line in the drawings;

Figure 19 is a chart indicating the timing of certain signal pulses during the transfer of information in the machine from the tape to the data register;

Figure 20 is a diagrammatic illustration of a section of the magnetic tape with a light source and a photocell for controlling tape movement; and Figure 21 is a chart showing the distribution and timing of coarse and fine timing (TC and TF) pulses during the forty minor cycles of a complete data register cycle in the machine.

*The printer itself*

For creating printing impressions in the first to fortieth positions of a line, the illustrative printer includes forty endless type rings or bands 10 (Figures 1 and 2) which may be referred to as type bands or units #1 to #40. In order to present desired characters in printing position, the bands 10 are rotatably supported and mounted side by side on the smooth periphery of a backing member such as the fixed hollow metal cylinder 12. This cylinder acts somewhat like the platen of a typewriter. The bands are normally driven frictionally by a belt 14 supported by pulleys 15 and 16 of which 16 is continuously rotated by a motor (not shown). These bands are preferably made of thin, light-weight, but strong, flexible material, such as aluminum, or one of the more stable and tough materials known as "plastics." Each band should be small in mass but capable of withstanding the shock of sudden stops at high speeds.

Each type band 10 is considered as having 72 equal arcuate divisions which may be referred to as segments. The segments may be considered as consecutively numbered 0 to 71 in counterclockwise sequence. All the segments are bordered by type blocks, any or all of which may be faced with types representing characters to be printed. In the disclosed embodiment, each type band 10 carries types for printing the letters of the alphabet and the digits 0 to 9 (see Figure 2). The type is suitably fixed to the bands, and should be of small mass, like the bands. At each radial line separating the segments, there is a hole 10*a* in the periphery of each type band, used in stopping and positioning the band.

The type bands are rotated counterclockwise. Rotation of each band may be arrested independently of the other bands. For this purpose, a known form of polarized magnetic structure is supported inside the cylinder 12. The magnetic structure includes a permanent field magnet 20 (Figure 1) spanning the type bands. Coacting with magnet 20 are individual armatures 21, one for each type band. Armatures 21 are pivoted at 22 and individually carry divided coils 23. Pivoted at 24 to each armature is a detent 25 for the associated band 10. The detents extend substantially radially through openings in magnet 20 and cylinder 12 and are urged downwardly by individual springs 26.

Figures 1, 1A:
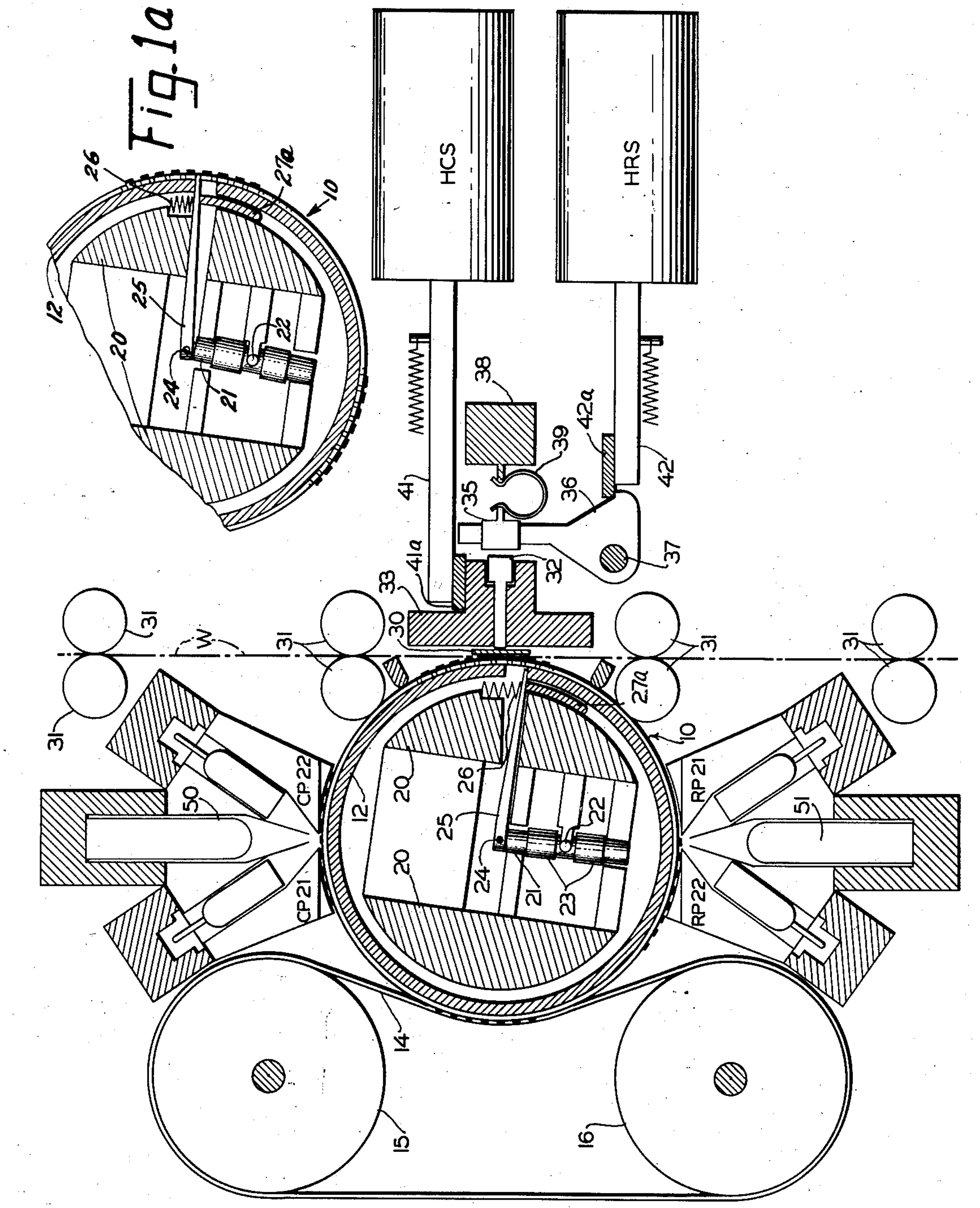

In the position of an armature 21 shown in Figure 1, the detent 25 is released from the type band and the band is driven. When the band is to be arrested, a pulse of current in the proper direction will be sent through the coil 23 on the armature. As a result, the armature will swing clockwise about pivot 22, as seen in Figure 1*a*, and extend the detent 25 to engage the shoulder or stop formed by one edge of a hole 10*a* of the type band to arrest it, the drive slipping to permit this. The armature and detent will remain in actuated positions until a pulse of current in the opposite direction is passed through the coil 23. This will be done when the type band is to be released for resumed rotation and will result in the armature and detent being restored to band release positions as shown in Figure 1. The kind of polarized magnetic structure used here is capable of extremely high speed operation, and is particularly useful for reasons which will later appear.

Preferably, the holes 10*a* in each type band will each be adjacent and coincide with a side edge of a type block so that the type block body will serve as a reinforcement of that edge of the hole constituting the shoulder which may be engaged by the detent 25. The holes or their shoulders or the type blocks may therefore be regarded as indexing or positioning elements for the type bands.

As explained above, a means is provided for accurately aligning the type horizontally before printing. For this purpose, the detents 25, in down positions, rest against the cross bar 27*a* of a bail 27 (also see Figures 2*a* and 12) pivoted at 28. The plunger 29 of a solenoid ALS is pivotally connected to each bail arm. When a detent is extended into engagement with a type band, the force of motion of the band moves the detent up against resistance of its spring 26 before the detent succeeds in stopping the band. The type bands will all be arrested in this fashion prior to a common printing time. Before printing is effected, the solenoids ALS will be energized to rock bail 27 counterclockwise. Bar 27*a* will then move all the detents upwardly against the upper wall of the opening in magnet 20 through which the detents pass, as indicated in Figure 1*a*. The arrested type bands will follow their detents and their selected types will be centered in alignment at printing position. In this way clearer and cleaner printing also will be effected.

Printing is effected on a sheet or web which may be a continuous sheet or a series of forms. Feed of the sheet may be effected by any known means such as disclosed, for example, in Patent No. 1,082,058, Watt. The paper feeding means illustrated here includes pairs of feed rolls 31 (Figure 1) some of which feed the sheet W between the type bands 10 and an ink ribbon 30. The ribbon is supported and driven by any suitable mechanism, not shown here since it constitutes no part of the present invention. Sheets of thinner paper with carbon ribbon or paper for copies may be also provided in any usual way. In back of the ink ribbon are slides 32 mounted in a frame block 33, one slide for each type band. The slides are for the purpose of creating printing impressions of the selected type characters. Each of the slides is operable by an associated hammer 35 fixed on an arm 36 which pivots on a rod 37 on the machine frame. Between each hammer and a frame piece 38 is a bow spring 39. When operation of the type bands is initiated to position them for the printing of selected characters, in a manner described later, a pair of solenoids HCS (only one shown) is energized momentarily. Each solenoid retracts its plunger 41, against spring resitsance, whereupon a bar 41*a*, supported between the plungers 41, engages the arms 36 of all the hammers 35 and rocks the hammers rearwardly, tensioning the bow springs 39. The hammers are latched in their rear, cocked positions by a latch bar 42*a* carried between the plungers of a pair of solenoids HRS, only one of which is shown. When the hammer-carrying arms 36 are rocked to cocked positions, they cam past bar 42*a* and into latched coaction therewith. Firing of the hammers 35 to effect printing will occur upon energization of solenoids HRS which releases the hammer-carrying levers 36. The springs 39 thereupon impel the hammers forwardly to strike the slides 32 and drive them against the ink ribbon, the paper, any included carbon paper and tissues, and the types aligned in printing position on the cylinder. The hammers are stopped by frame block 33 before the slides 32 complete their printing strokes, but the momentum imparted to the slides enables them to strike the types sharply and then to rebound. The cylinder, by backing up the type on the rings or bands, gives proper support for clear printing. The usual springs may be used to return the slides 32 to rear positions.

*The tape and code*

Figures 2, 2A:
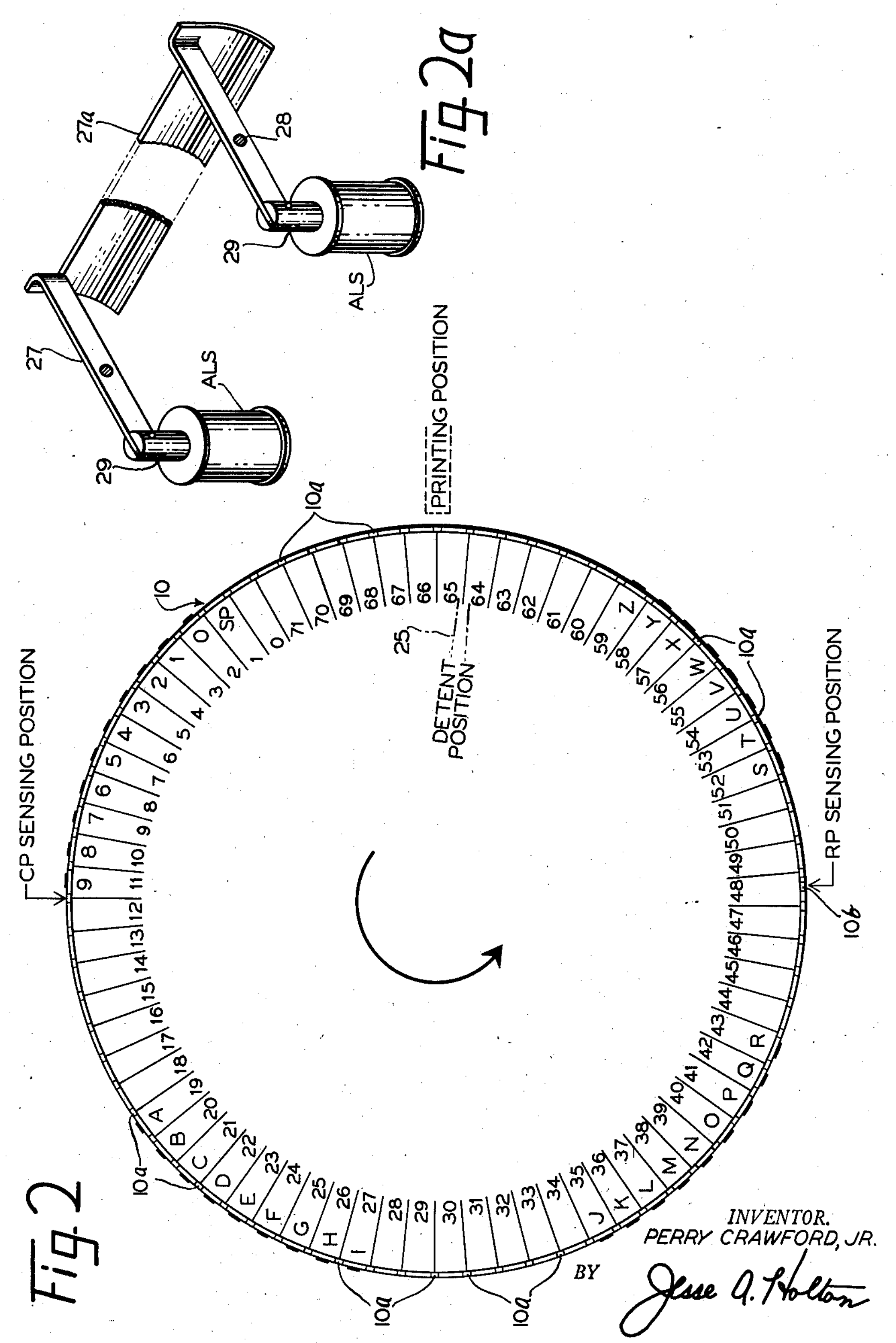

The data to be printed is prepared ahead of time and will be derived in the illustrative embodiment, from a magnetic six channel record tape T (Figure 20) which may be fed by any suitable means, preferably by means such as disclosed in copending application Serial No. 284,597 of T. C. Gams and P. J. Kiefer, Jr., filed April 26, 1952, which is assigned to the same assignee as the present invention. The tape has successive record blocks spaced apart, a black marker line T*s* being provided centrally between adjacent blocks. Each block is of a length to accommodate forty transverse lines of magnetically represented characters or functions, one character to each transverse line. Each block therefore will hold a coded representation of one group of forty characters to be printed. The code used is a six-position binary code and a character or function is represented by one or more magnetic spots, also called bits, in the six binary index positions or channels along a transverse line. Presence of a spot in a binary position may denote the binary digit 1; and absence, the other binary digit 0. Each representation has a unique value in the binary notation. With six binary positions, the range of values is from 000000 to 111111, equivalent to 0 to 63 in the decimal system. No use will be made, however, of the representation 000000, zero being represented here in the "excess 2" code by 000010. The space function ordinarily performed by the space bar of a typewriter is represented in the code by 000001; digits 1 to 9 by 000011 to 001011, respectively; and the letters of the alphabet by binary code values equivalent to the numbers of the type band segments which bear the types for the letters, as shown in Figure 2. It is to be noted that each of the lines of a record block bears a representation, those lines on which characters are not represented being provided with the representation of the space function. For convenience, all the representations may be called character representations.

*Type band positioning*

The coded representations on the first to fortieth lines, respectively, of a record block control the settings of the type bands #1 to #40. Segments 1 to 63 of each type band (see Figure 2) correspond to code numbers 000001 to 111111. Each character type is in the segment having a number matching the value of the code representation of the character. The positioning of a type band therefore basically involves comparison of the code value of the representation with the segment numbers to find the matching segment. According to the present invention, this will be done by a procedure involving the counting of the segments passing printing position. The counting starts with segment 65 at printing position. Because of the counterclockwise rotation of the bands and numbering of the segments, the segments pass printing position in descending value sequence. Hence, a desired segment is a number of segments away from the printing position equal to the difference between 65 and the value of the controlling representation, the latter value being also that of the desired segment. Therefore, by adding 1 to the value of the controlling representation for each of successive segments passing the printing position until the total is 64 and stopping the type band after it has moved one more segment, the desired segment is arrested at printing position. After all the type bands have been arrested in this manner, the aligning bar **27*a*** will be operated to center the selected segments at printing position.

As an example, assume the controlling representation to be 111011, which is the code for character Z. Segment #59 which bears the Z type is six segments away from printing position when counting starts. As segments #65, 64, 63, 62 and 61 move past printing position, five 1's are added to the control code number 111011, making the total 1 000000. The 1 in the seventh binary position is the result of a carry and will be used to notify the machine to stop the type band when it has moved an additional segment, segment #60 in the example, past the printing section. Segment #59 will then be at printing position, prepared to print character Z.

The number of segments of a type band which pass the printing position is the same as the number passing any other point of the locus of the band and may be sensed at such point. In the present embodiment, the sensing is done at a point about 90 degrees ahead of the printing position by means of photocells CP21 and 22. The surface of each type band except at apertures **10*a* and 10*b*, is opaque to and does not reflect much light because of the material of the band and of the type matrices covering the segments. On the other hand, the surface of the metal cylinder 12 is polished to provide a smooth light-reflecting surface. Each time a hole 10*a* in the type band crosses the light beam from a source 50, it exposes the cylinder to the light and the cylinder reflects the light to the photocells CP. Thus, the photocells CP are activated each time a segment defining hole 10*a* crosses sensing position and will be used to count the segments as explained later. Each type band has an additional hole 10*b*, which may be termed the revolution hole because it signals the start of a revolution within which segments are to be counted. Hole 10*b* is in segment #48 about one-third a segment length away from the hole 10*a* at the leading end of the segment #48. Once per revolution of the band, the hole 10*b* exposes the cylinder 12 to light from a source 51 and the cylinder reflects this light to photocells RP21 and 22**.

Photocells CP and RP are therefore so located that they are unable to sense any two of the holes **10*a* simultaneously. Once per revolution of the type band, the photocells RP will sense the hole 10*b* and the photocells CP will simultaneously sense the hole 10*a* at the leading end of segment #11. This will signal the machine to start counting the segments. This will be when segment #65 is opposite printing position. The first addition of 1 will occur when segment #11 is past the photocells CP and as a result of the photocells sensing the hole 10*a*** at the lagging end of this segment, as will be explained in detail later. Because each of the forty type bands is to be independently set under control of the character representation on a related line of a record block, a separate segment count must be made for each band. It is to be understood, therefore, that there are pairs of photocells CP and RP for each band.

The printer is to operate at high speed. The illustrative embodiment is designed to print 10 lines per second. Since a type band may have to move nearly a full revolution from an arrested position to its start counting position and nearly a full revolution from start counting position to a new arrested position, the speed of the type bands is made about twice the printing speed. A steady speed of 25 R. P. S. is sufficient to take care of printing 10 lines per second. The minimum distance a type band has to move from an arrested position to start counting position covers inactive segments #0 to #66 and is sufficient to permit the type bands to reach full speed by the time segment counting starts.

*Controls—electronic components*

The controls of the printer utilize known high speed electronic components in novel combinations. Since the components themselves are known, they are illustrated diagrammatically. The components used include "and" gates, "or" gates or buffers, delay lines, amplifiers and flip-flops or triggers. For a more detailed description of the components and symbols used here, reference is made to copending patent applications assigned to the same assignee as the present invention, for example, Serial No. 370,538, "Electronic Digital Computer," filed July 27, 1953, by Samuel Lubkin.

In the present drawings Figure 14 shows the symbol for the "and" gate, also called a coincidence gate. This gate produces positive signal voltage on its output only when all its inputs are positive. The symbol for the buffer is shown in Figure 15. The buffer, also called an "or" gate, produces positive signal voltage when any of its inputs is positive. Either type of gate has negative output voltage when the required input condition is not satisfied. The coincidence gates and buffers may be built up from crystal diodes properly connected together in a fashion well known in the electronic computer art. These diodes are sometimes called unilateral conducting devices.

Figure 16 shows the symbol for a trigger or flip-flop. These are also called bi-stable circuits. These devices have the characteristic of storing information by holding a set pulse or signal until reset by a negative signal. Any known form of flip-flop, dynamic or static, may be used. The one preferred is reversed from reset to set state in response to a positive signal on the input marked "set" and returns to reset state upon the input marked "reset" going negative. In its set state, the flip-flop provides positive voltage on the output *p* and negative voltage on the output *n*. In reset state, the polarity of these outputs is reversed. The flip-flop may be a composite of gates, delay line, and amplifier essentially as indicated in the above copending applications assigned to the same assignee as the present invention. It will be noted that when the flip-flop is in reset state, it is opening the device to a setting pulse. Hence, even if set and reset pulses should be simultaneously applied, the set pulse will prevail; the flip-flop will be set, its output *n* will become negative after a ¾ delay. This delay on the *n* output of a flip-flop will be assumed to apply to all such devices used here. A reset pulse applied thereafter will be effective to reset the flip-flop. Unless stated otherwise, each flip-flop in the circuits is understood to be of this type called "set-dominated." The set and reset gates of flip-flops shown elsewhere in the drawings will be embraced by the flip-flop symbol of Figure 16 except where the description may be clarified by showing one or the other or both of these gates outside the symbol.

Figure 17 shows the symbol for an amplifier, also called a pulse amplifier. When not acted on by a positive signal on its input, the amplifier provides positive voltage on the output *n* and negative voltage on the output *p*. In response to a positive input signal, the amplifier reverses and amplifies the polarity of its outputs. Output *n* may be referred to as the normal output and output *p* as the driven output.

Figure 18 shows the symbol for a delay line. The delay line will have negative output except when a positive signal reaches the output. The total delay in the line is given by the number inside the box. If intermediate delays are required, they will be taken off tap points, in which case the value of the intermediate delay will be given at the tap point and the total delay at the output end of the line. The delays are given in terms of the basic clock pulse time or period unless otherwise indicated. It is to be understood that a long delay line may include intermediate pulse reshaping means which need not be shown.

*Timing of operations*

Timing pulses for the printer are produced by the circuits in Figures 3, 4, 5 and 6. The C0 pulse is the main clock pulse. C1 pulses are ¼ later than C0. C2 pulses are the inverse of C0 and C3 pulses are the inverse of C1. All of these pulses are approximately square and of megacycle frequency, or one pulse each microsecond. A series of eight pulses T0 and T7 appears in each minor cycle. Pulses TF1 to TF5 respectively occur in five successive minor cycles at T7 times. Pulses TC1 to TC8 are used in combination with pulses TF1 to TF5 to correlate the type bands #1 to #40 with the first to fortieth lines of a record block, respectively. There are five pulses TC1 coinciding with a series of TF1 to TF5 (also see Figure 21) followed by five pulses TC2 coinciding with a next series of TF1 to TF5, and so on, any particular combination of TF and TC pulses appearing only once in forty minor cycles.

Figures 3, 3A:
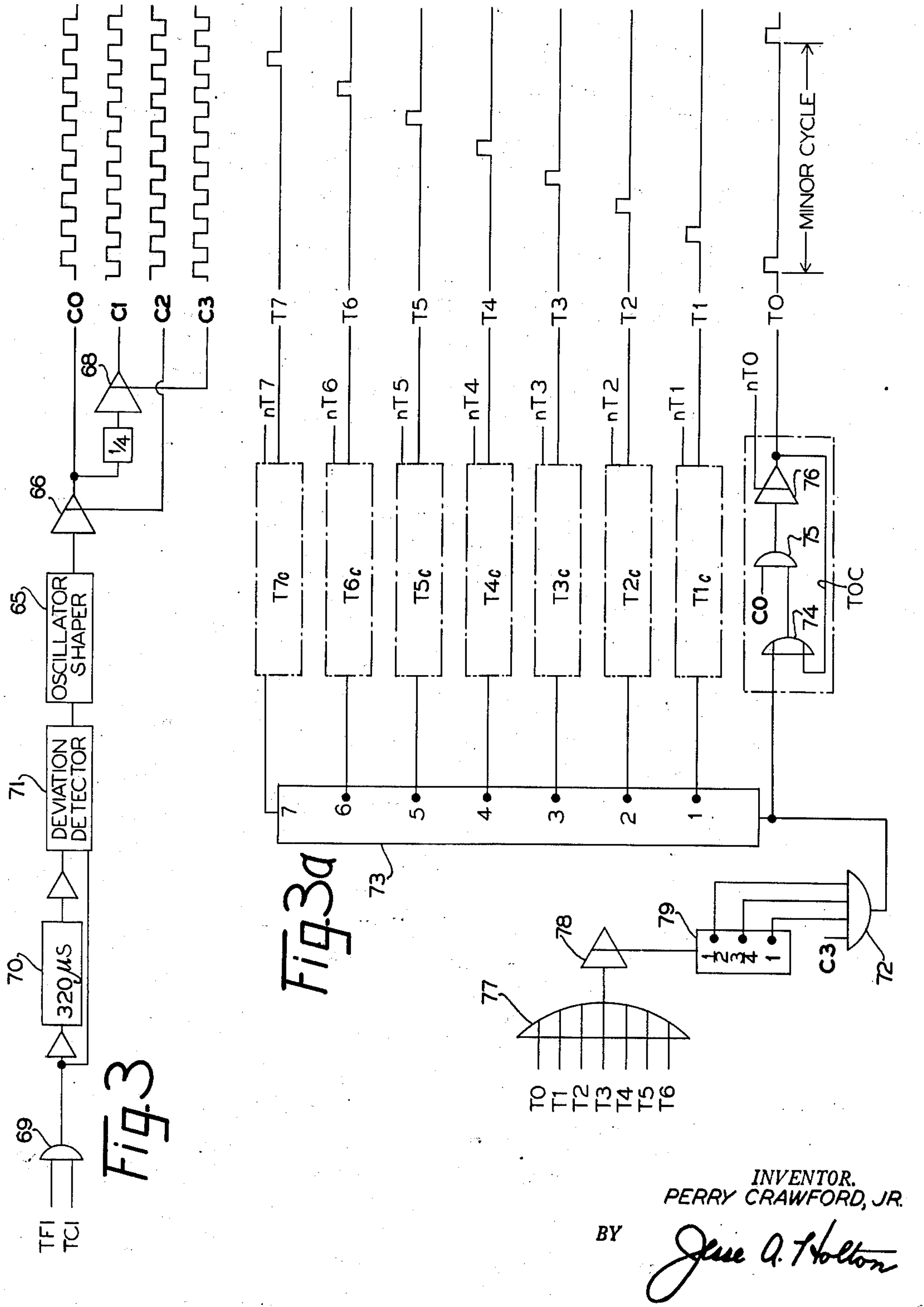

Referring to Figure 3, a suitable oscillator-shaper 65 controls an amplifier 66 to produce the pulses C0 and C2. The C0 pulses, delayed ¼, control an amplifier 68 to produce the pulses C1 and C3. At TF1 and TC1 coincidence, a gate 69 pulses delay line 70 to control a conventional deviation detector 71 which has feed back to the delay line and which corrects the oscillator-shaper upon detecting pulse drift.

The oscillator-shaper 65 is bias-controlled to speed up or slow down the rate of clock pulses so that there will be 320 C0 pulses occurring in the time interval of the delay 70.

Pulses C3 act on a gate 72 (Figure 3*a*). Assuming the gate is open, it applies the pulse to a circuit T0C and to a delay line 73. In circuit T0C, the pules acts via a buffer 74 to open a gate 75 to a C0 pulse. The C0 pulse activates the gate to effect operation of an amplifier 76. The amplifier generates the positive pulse T0 and the inverse pulse *n*T0. The amplifier output also is fed back to the gate 75 by way of the buffer 74 so as to give full effect to the C0 pulse in order that the T0 pulse shall be a full pulse in phase with the C0 pulse. Similar reclocking and reshaping circuits are provided wherever the conditioning pulse on a gate is earlier than the clocking pulse and will be recognized without further explanation. The circuits T1C to T7C are like circuit T0C and are operated by the input pulse to the relay line 73 at the "1" to "7" delay times, respectively, to generate the pulses T1 to T7 and their inverse pulses *n*T1 to *n*T7. The T0 to T6 pulses act via a buffer 77, amplifier 78 and delay element 79 to shut the gate 72 except to every eighth C3 pulse, the one preceding T0 by ¼ period. Thus, discrete series of pulses T0 to T7 are produced, each series in a minor cycle. These are used to represent characters, as will later appear.

Figure 5 shows the circuits for producing the pulses TF1 to TF5. A pulse C0 operates a gate 80 to apply a pulse to a delay line 81. At the indicated delay times, the pulse is fed back to gate 80 via a buffer 82, an amplifier 83 and a delay element 84, the gate 80 thereby closing to the next four C0 pulses. Hence, only every fifth pulse C0 passes through gate 80. Certain of these pulses after the indicated delays overlap the early parts of T7 pulses. Assuming a pulse C0 at T4 time is applied by gate 80 to delay line 81, it acts after a "2¾" delay via a buffer 85 to condition a gate 86 to respond to a T7 pulse and operate an amplifier 87, generating a pulse TF5. The next productive C0 pulse is at T6 of the next minor cycle and after a ¾ delay enables a T7 pulse to be effective in the generation of a TF1 pulse. In the next minor cycle, the C0 pulse at time T3 coacts with a T7 pulse after a delay of 3 and ¾ periods to cause a pulse TF2 to be produced. At T5 of the next minor cycle, the C0 pulse applied to gate 80 enters the delay line 81 and after a delay of 1¾ combines with a T7 pulse to cause the pulse TF3 to be generated. In the succeeding minor cycle, the C0 pulse at T2 time is effective after a 4¾ delay to combine with the T7 pulse in causing a pulse TF4 to be produced. In the following minor cycle, the productive C0 pulse is again at T4 time, so that pulse TF5 will repeat. When a delayed C0 pulse does not overlap part of a T7 pulse (as at T0, T1 and T7 times) then no TF pulse will be produced because there will be no coincidence of a delayed C0 pulse with a T7 pulse on any of the gates leading to the TF circuits.

In order to prevent "spikes" at the leading and lagging edges of pulses, the inhibiting arrangement of Figure 5 may be used. This same sort of inhibitor may also be used in similar situations, such as between C0—clocked gate 127 and gate 132 in Figure 8*b*.

Figure 4 shows the circuits for producing the pulses TC1 to TC8. The circuits include three binary-coupled flip-flops B1, B2, and B4. With B1, B2 and B4 initially in reset states, they are opening their respective "set" gates *g*1, *g*2 and *g*4. They are also acting in combination to open a gate 113 to T7 pulses. Each T7 pulse will therefore activate gate 113 to cause amplifier 114 to generate a pulse TC8. The input pulses to the network of flip-flops B1, B2 and B4 are TF5 pulses delayed "1" (one period) by a delay line 98.

The first TF5 input pulse acts via an amplifier 99, the gate *g*1 and an amplifier 100 to set B1. Amplifier 100 also forces a pulse via gate *g*2 to operate an amplifier 101 for setting B2. Amplifier 101 sends a pulse through gate *g*4 to set B4. The three flip-flops are now set. They shut their gates *g*1, *g*2 and *g*4 and combine to condition a gate 104. In the next five minor cycles, gate 104 will respond to T7 pulses and operate an amplifier 105 to generate TC1 pulses. At the fifth TC1 pulse, a TF5 pulse recurs and after the "1" delay provides the second input pulse to the flip-flops. Amplifier 99 responds and resets B1, transferring conditioning to a gate 106, whereby TC2 pulses will be produced. The second input pulse does not set B1 or alter the states of B2 and B4 because the gates *g*1, *g*2 and *g*4 are shut.

The third input pulse again sets B1 since its gate *g*1 had reopened after it was reset by the second input pulse. The setting pulse for B1 also operates amplifier 100 to reset B2. With B1 and B4 set and B2 reset, a gate 108 is open and pulses TC3 will be produced. The fourth input pulse resets B1, transferring conditioning to a gate 109, so that pulses TC4 will be produced.

The fifth input pulse again sets B1. Amplifier 100 also pulses reopened gate *g*2 to set B2 by operation of amplifier 101. As amplifier 101 operates, it also resets B4. With B1 and B2 set and B4 reset, a gate 110 is conditioned, and pulses TC5 will be generated. The sixth input pulse resets B1, transferring conditioning to a gate 111, whereby pulses TC6 will be produced.

The seventh input pulse sets B1 and resets B2, transferring conditioning to a gate 112 to produce the pulses TC7. The eighth input pulse resets B1. All three flip-flops are then in their initial states and TC8 pulses will be generated in the next five minor cycles at T7 times.

Referring to Figure 6 and Figure 21, once every forty minor cycles the combination of pulses TF1 and TC1 appears at T7 time and is effective on gate 117 to cause amplifier 118 to generate a pulse TD and its inverse *n*TD.

*Tape reading and control units*

The tape T (Figure 20) is read in motion, one line after another, by six magnetic heads H1 to H6 diagrammatically shown in Figure 8*a*. Heads H1 to H6 are disposed transversely of the tape at the reading station to read binary code positions 1 to 6 of a line, respectively, the reading occurring simultaneously in all heads. The reading unit provides amplifiers AM1 to AM6 between the magnetic heads H1 to H6 and flip-flops F1 to F6, respectively. Upon a head sensing a magnetic spot or bit, it affects the intervening amplifier to set the connected flip-flop. Flip-flops F1 to F6 thus store a sensed code representation, bits being manifested by set state of the flip-flops and absence of bits by reset state. The set flip-flops produce positive potential on the output lines D1 to D6. For instance, if the code 011011 for A is sensed, F1, 2, 4 and 5 are set and F3 and 6 remain reset, and lines D1, 2, 4 and 5 are at positive potential and lines D3 and 6 at negative potential.

The tape control unit includes thyratron tubes VS and VP. Tube VS is in series with a coil 48ST and a capacitor *Ca*1. The capacitor is in parallel circuit with the tube VP and a coil 48SP. Capacitor *Ca*1 corresponds to a similarly designated element in said Gams and Kiefer copending application and coils 48ST and SP correspond to a pair of the coils 48L–ST and 48L–SP or 48R–ST and 48R–SP in said application. To start tape feed, a pulse will be fed via a coupling capacitor *Ca*2 to tube VS, rendering it conductive. Current will flow via the tube to energize the start feed coil 48ST and to charge the capacitor *Ca*1. To stop tape feed, a pulse will be sent via a capacitor *Ca*3 to the tube VP. The tube starts to conduct and the capacitor *Ca*1 discharges through the tube and the coil 48SP. The energization of this coil causes tape feed to stop in the manner disclosed in said copending application. The start feed pulse to tube VS will originate in the Data Transfer Control when transfer of a block of data from tape to the data register DR is called for. The stop feed pulse to tube VP will occur after the tape has fed a block continuously past the reading station and will be effective to stop the tape just after the block marker T*s* (Figure 20) following the block has been sensed at the reading station.

The sensing means for the block marker is a photocell TP on which the tape reflects light from a source 119 except when the black block marker crosses the reading station and intercepts the light. The photocell reacts to the interruption of light by operating an amplifier ATP (Figure 8*a*) in the tape control unit to pulse a pair of gates 167 and 168, one or the other of which will be conditioned in a manner described later. The conditioned one of the gates will apply the pulse via a buffer 171 and the capacitor *Ca*3 to tube VP, and the tape will be stopped. The block marker is a thin black line and will pass the reading station before the tape comes to rest.

The lines of character representations on the tape are closely spaced, a spacing of .01 inch, for instance, having been found satisfactory. The tape will be fed at a maximum rate of one line per forty-one minor cycles.

*The data register and its input unit*

As explained before, the flip-flops F1 to F6 (Figure 8*a*), will be selectively set according to the bits in a character representation read on a line of the record tape T, and those of the lines D1 to D6 connected to the set flip-flops will be at positive potential.

Lines D1 to D6 are input lines to gates G1 to G6 clocked by T1 to T6, respectively, in order to convert the simultaneous readings from the heads into a series of pulses. A common input line R will be made positive, in a manner explained in the section on Tape to Register Transfer, to enable those of the gates conditioned by lines D1 to D6 to operate during a minor cycle at their clocked times. The active gates will apply pulses via a buffer 120 to a C1-clocked gate 121 which will direct the pulses, delayed ¼, to an amplifier 122 which enters them into the data register DR. For example, if the A representation, 011011, is stored in F1 to F6, lines D1, D2, D4 and D5 are at positive potential and are conditioning gates G1, G2, G4 and G5. Assuming line R is positive, gates G1, 2, 4 and 5 will send pulses, which may be called bit pulses, to the register at times T1, T2, T4 and T5, respectively, of a minor cycle. The A representation is thus entered in the register between T1 and T6 times, delayed ¼, as pulse, pulse, no-pulse, pulse, pulse, no-pulse, the least significant digit entering first, with the more significant digits following.

The data register DR is an acoustic delay line with a delay of "319½" (319½ basic clock pulse periods). Since the bit pulses representing a character are applied to the register during a minor cycle, the register can simultaneously transmit a stream of forty characters at minor cycle spacing; i. e., the register has sufficient capacity for all the characters of a record block.

A bit pulse is transmitted by the data register DR via its output line 123 to an amplifier 124 (also see Figure 8b). The amplifier drives the pulse through a buffer 125 to the C0-clocked gate 127 of an "add 1" circuit. If the pulse is not suppressed by the "add 1" circuit, it returns, undelayed, to the register by way of a line 135, a recirculation gate 136 (Figure 8a), the buffer 120, gate 121 and amplifier 122. The bit pulse entered the register at one of the T1 to T6 times delayed ¼ by gate 121, was delayed "319½" by the register, and another ¼ period by the gate 127 of the "add 1" circuit. The bit pulse therefore was applied to the "add 1" circuit at one of the T1 to T6 times of a minor cycle 320 periods after it was first applied to the input gate 121 of the register. Assuming the pulse is not suppressed by the "add 1" circuit or by the recirculation gate 136, the pulse will therefore reenter the gate 121 of the register 40 minor cycles after it was previously entered. This interval of 40 minor cycles may be called a register data cycle or simply a data cycle.

It is evident that a character entered in the register will be recirculated at data cycle intervals unless inhibited or erased at the recirculation gate 136. In other words, a character entered in the register in a minor cycle of one data cycle may reenter the register in the corresponding minor cycle of the next data cycle. It is to be noted that the recirculation gate 136 is clocked via a buffer 137 by T1 to T6 pulses.

*The "add 1" circuit*

In order to arrest each type band at its proper position, the "add 1" circuit is included in the controls. This may be called an electronic counter, since it counts at electronic speeds. The "add 1" circuit (Fig. 8b) is a binary adder for which the binary coded character received, 1st to 6th binary positions serially, from the register DR (Figure 8a) is the addend. As explained in the preceding section, a bit pulse issuing from the register is entered by the gate 127 into the "add 1" circuit at one of the T1 to T6 times of a minor cycle. The pulse is applied by gate 127 to an amplifier AD which is the addend element of the "add 1" circuit. Operation of AD at one of the times T1 to T6 therefore manifests binary digit 1 in a corresponding one of the 1st to 6th positions of the character. Absence of operation of AD at one of these times manifests 0 in the corresponding position of the character.

The augend element of the "add 1" circuit is a flip-flop AG which manifests 1 if set and 0 if reset. AG will be set only during the positioning procedure for the type bands 10 (Figures 1 and 2), explained in a later section. During the positioning procedure, AG will be set in response to a delayed signal A. Signal A will be produced, as a result of the sensing of a segment defining hole 10a of a type band, at the T7 time of a minor cycle preceding the one in which the control character for this type band enters from the register into the "add 1" circuit. The signal A will be delayed 1¾ periods by a delay element 128, so that the setting of AG will occur ¼ period before T1 of the minor cycle in which said control character is applied to the addend element AD of the "add 1" circuit.

The add 1" further includes a gate 131 at the driven output of AD and the normal output AG and another, C0-clocked, gate 132 at the driven output of AG and the normal output of AD. Gates 131 and 132 connect via a buffer 133 to an amplifier 134. The driven side of 134 connects to the output line 135 of the "add 1" circuit, while the normal side of 134 connects to the reset input of AG.

The above elements combine to perform binary addition according to the following rules:

If the addend digit in a binary position of a code number is 0 and the augend is then also 0, AD and AG are off and both gates 131 and 132 are inactive. No pulse issues.

If the addend digit is 1 and the augend is 0, AD is on and AG is off; gate 131 responds to the on-turning of AD and operates amplifier 134 to issue a pulse to line 135 for recirculation in the data register. Thus, with AG off, the applied addend is passed by the "add 1" circuit without change.

If the addend digit in the 1st binary position is 0 and the augend is 1, AD is off and AG is on at T1 time of a minor cycle. Gate 131 is inactive but gate 132 is activated and operates amplifier 134 to issue a pulse at T1 time to line 135. The amplifier resets AG. The rest of the code number therefore goes through unchanged. Thus, 0 in the 1st position has been replaced by 1 and the code number has been increased by 1 to be recirculated in the register.

If the addend digit in the 1st binary position is 1 and the augend is also 1, AD and AG are on, both gates 131 and 132 are shut, and no pulse will issue. Thus, the digit 1 in the 1st position of the code number is replaced by 0 and the carry of 1 to the 2nd position is manifested by AG remaining on.

If the 2nd position of the code number also contains 1, it will be affected similarly, being replaced by 0, while AG continues in set status to effect carry to the 3rd position.

Replacement of digits 1 by 0 will continue until a binary position containing 0 arrives at the "add 1" circuit. Element AD will then be off while AG will be on. Hence, gate 131 will be shut while gate 132 will operate at C0 time and via buffer 133 activate amplifier 134 to issue a pulse to line 135. The normal output of 134 will go negative at the same time and reset AG. Thus, as a result of carry from a lower position, a 0 is the next higher position is replaced by 1 and carry will go no further.

As an example, assume the A code number 011011 is entered in the "add 1" circuit and that AG has been set with augend 1. At T1, the 1 in the 1st binary position operates AD. Both AD and AG being on, no pulse will issue to line 135 at T1 time. Likewise, since the 2nd position also contains digit 1, no pulse will issue at T2 time. The 3rd position is at 0; hence, AD will be off during T3 time while AG has remained on. Gate 132 will operate and a pulse will be issued to line 135 at T3 time by actuation of amplifier 134. Amplifier 134 also resets AG at that time. The rest of the code number therefore will pass to line 135 without change. In the above manner, the A representation has been augmented by 1; i. e., the A code number came into the "add 1" circuit as pulse, pulse, no-pulse, pulse, pulse, no-pulse and the augmented number issued from the circuit as no-pulse, no-pulse, pulse, pulse, pulse, no-pulse which corresponds to 011100 and is greater by 1 than the A code number 011011. The augmented number is transmitted by line 135 to the recirculation gate 136 (Figure 8a) to be recirculated in the data register.

Attention is called to the fact that if a binary number 111111 enters the "add 1" circuit during a minor cycle and AG has been set, the 1's will be replaced by 0's. AG will still be on at T7 time, so that amplifier 134 will operate then to reset AG and put a pulse on line 135. Thus, 111111 has been increased to 1 000000, the 1 in the 7th binary position being a carry manifested by an output pulse from the "add 1" circuit at T7 time. The carry pulse has no effect on recirculation gate 136 (Figure 8a) which can operate only between times T1 to T6, because of the output of buffer 137. The carry pulse, instead, will be effective via a gate 138 and amplifier 139 to condition a band arresting circuit for stopping a type band at T7 time, in a manner described later.

*Tape to register transfer*

The printer may be set to perform a single print run on one block of data or to perform a plurality of such runs in automatic succession. During a print run, the tape T will be fed continuously while a block of data is transferred to the register. When the block has been completely transferred, the tape will be stopped and a signal will be given to the type band circuits to start the positioning procedure whereby the bands will be positioned according to the data of the block transferred to the register. Printing operations will then be effected. If the printer has been set for a single run, it will wait until another run is manually initiated. But if the printer has been set for automatic successive runs, the printing of the data of one block will be followed automatically by a next print run.

Figure 7:
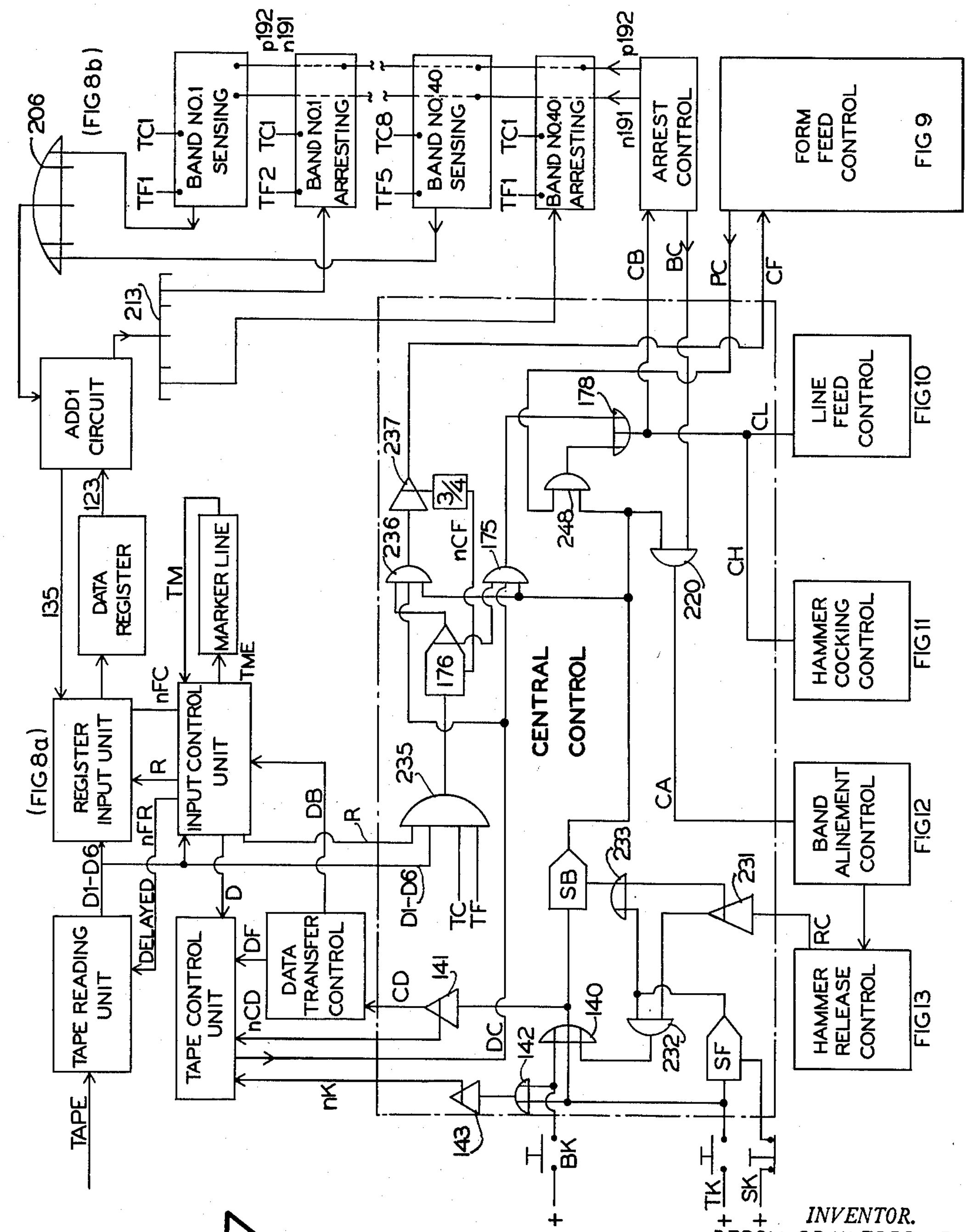
Figure 7 is a diagram showing the electronic central control for the printer, with the general connections to other parts of the printing and controlling mechanisms for the machine.

A single print run can be initiated by momentary closure of a normally open push button switch BK at the Central Control (Figure 7). This results in a buffer 140 setting flip-flop SB and activating amplifier 141 leading to the tape control and data transfer control units. At the same time a buffer 142 operates amplifier 143 leading to the tape control.

Automatically successive print runs are initiated by momentary closure of a normally open push button switch TK. This acts the same as switch BK in setting 140 and operating 141 and 143. In addition, switch TK sets a flip-flop SF.

Amplifier 141 produces positive signal CD to the data transfer control, and negative signal *n*CD to the tape control. Amplifier 143 issues negative signal *n*K to the tape control unit.

Signal CD operates buffer 144 in the Data Transfer Control (Figure 8*a*) to set flip-flop 145. Signal *n*CD resets flip-flop 146 in the Tape Control unit and signal *n*K resets flip-flop 147 in the same unit.

A single tape to register transfer also can be initiated at the Transfer Control by momentarily pressing a push button MD. Contacts MD*a* close and apply potential to buffer 144 which sets 145. Contacts MD*b* and MD*c* open and cause reset of 146 and 147 in the Tape Control unit.

Upon flip-flop 145 in the Data Transfer Control being set, it conditions a gate 150 to respond to a TD pulse. Gate 150 thereupon sets flip-flop 151. Output DB of 151 goes positive and after a ¾ delay opens a gate 152 to the end of the next TD pulse. The pulse is transmitted by gate 152 via a buffer 153 to a C–1 clocked gate 154 which operates amplifier 155 to enter a TM*e* pulse into a marker line ML. Line ML is an acoustic delay line which relays the pulse "319½." The pulse reaching the output of ML is driven by an amplifier 156 to a buffer 157 which applies the pulse to a C0-clocked gate 158. Response of the gate operates amplifier 159 to produce a marker pulse TM.

The marker pulse TM goes to a gate 160 to test for the presence of a character in the flip-flops F1 to F6. If a character has been read into these flip-flops, at least one of the lines D1 to D6 is positive and operates through a buffer 161 to produce a D signal. After passing through a delay line 162 in order to compensate for irregularities from the tape record pickup, the D signal reaches gate 160, enabling it to respond to a TM pulse and thus set a flip-flop FC. If the flip-flop is set, its output *n*FC goes negative and shuts the gate 154 so as to prevent the same TM pulse from reentering marker line ML. If the flip-flop has not been set, the same pulse TM is returned to the marker line by way of a gate 163 and the previously mentioned elements 153, 154 and 155. Only one marker pulse at a time is permitted to circulate in the marker line. Hence, whenever the flip-flop 151 in the Data Transfer Control sets in response to a TD pulse to enable the gate 152 to pass the next TD pulse to the input elements of the marker line to be utilized as a marker pulse, the negative output *n*DB of the flip-flop 151 shuts the gate 163 to erase a possible preceding TM pulse. The negative output *n*DB also is effective whenever flip-flop 151 is set to shut the recirculation gate 136 of the data register DR so as to erase any character which may possibly be seeking reentry into the register, although it is not likely that there will be any character seeking reentry.

The next TD pulse after the one which set flip-flop 151 is ineffective because of the gate 150 of the flip-flop being shut by the now-negative line *n*DB, delayed ¾. The inverse pulse *n*TD is effective, instead, to reset flip-flops 151 and 145, through buffer 148. As 151 resets, its output *n*DB goes positive and acts via a coupling capacitor 149 to operate an amplifier 164. The amplifier sends an input signal DF to tube VS, so that the start feed coil 48ST is energized, initiating tape feed. The tape now advances the lines of a record block to the reading station to be sensed successively. Before the first line of the block reaches the sensing station, the marker pulse TM is being recirculated in the marker line. The marker pulse originated from a pulse TD at gate 152, was delayed ¼ at gate 154 by clock pulse C1, reached the output of the marker line after a further delay of "319½" and after a still further delay of ¼ at gate 158 by clock pulse C0 went to the gate 160 of flip-flop FC. The marker pulse TM is therefore at T7 time of a minor cycle since it was delayed a total of 40 minor cycles from the input pulse TD. As long as the pulse TM finds gate 160 unopened by a signal D, it recirculates at the same interval of forty minor cycles, equal to one data cycle.

When the first line of the block reaches the reading station, it is sensed and the first character, on this line, is read into flip-flops F1 to F6. Lines D1 to D6 selectively become positive to condition the gates G1 to G6 accordingly. Also the signal D is produced and, after a delay in line 162 to take care of pickup irregularities, conditions the gate 160. The next T7 time a marker pulse TM reaches this gate, it causes the gate to set the flip-flop FC. This occurs during a minor cycle which may be designated minor 40 (see Figure 19). As FC is set, its output *n*FC shuts the recirculation gate 136 of the data register and the gate 154 to the marker pulse. Thus, the marker pulse which initiated setting of FC upon finding a character present in the flip-flops F1 to F6, is erased.

Flip-flop FS remains on until it is reset in the next minor cycle by a delayed *n*T6 pulse at T6 ¾ time. This next minor cycle may be identified, with reference to the transfer of the block into register DR, as the first minor of the first data cycle. As FC is set, its output R is positive and enables gates G1 to G6 to operate between T1 and T6 times of the first minor of the first data cycle for transferring the first character into the register. Meanwhile, the normal negative output *n*FC of the flip-flop FC is closing recirculation gate 136 of the register to erase the first character of the block previously transferred into the register, so that the first character of the new block can take its place.

While FC is set, it is conditioning the gate 165 of a flip-flop FR. At T6 of the first minor in the first data cycle, the gate 165 responds to a pulse T6 and sets FR. The output *n*FR of flip-flop FR becomes negative, causing a delay element 166 to apply negative potential at T6 ¾ time to the reset inputs of all the flip-flops F1 to F6, thereby resetting them after the character has been transferred to the register. FR itself is reset at T5 time of the next minor cycle by an *n*T5 pulse.

When FR is set at T6 time of the first minor in the first data cycle, its driven output opens a gate 170. The T7 pulse in the same minor cycle activates the gate 170 to apply a new marker input pulse to the input element 153 for the marker line, with the result that the pulse TM*e* enters the marker line at T7 ¼ of that minor cycle being delayed ¼ by clocking pulse C1 on gate 154. This pulse will come out of the marker line and its output elements as a TM pulse at T7 of the first minor of the second data cycle.

Note should be taken of the fact that the marker pulse TM for the first character transfer is always in phase with a TD pulse. Since the TD pulse is a combination of TF1 and TC1 pulses (see Figures 6 and 21), this combination is unique to the character transferred from the first line of a block into the register.

If the marker pulse TM for the second character finds the gate 160 conditioned by a delayed D signal in consequence of the second character of the block having been read into the flip-flops F1 to F6, the gate will respond to the marker pulse and set flip-flop FC. If the second character has not been read into F1 to F6 or if the delayed signal D is not yet at gate 160 when the second marker pulse reaches the gate, then this marker pulse will be recirculated in the marker line ML. The marker pulse will come out forty minor cycles later and again test gate 160 for the presence of the second character. Assuming the second character has been read into F1 to F6 and gate 160 is conditioned, the marker pulse will activate the gate to set FC. Hence, the second character will be transferred to the register in the next minor cycle. Since the second character marker pulse TM was originated near the end of the first minor cycle in the first data cycle, it appears at T7 of the first minor cycle in a later data cycle which is identified in Figure 19 as the second data cycle. The second character, therefore, enters the register in the second minor cycle of the second data cycle. Since a character in the register recirculates at intervals of a data cycle, the first character, entered in the first minor cycle of the first data cycle, reenters the register in the first minor cycle of the second data cycle, thus preceding the second character by one minor cycle.

The setting of FC by the second character marker pulse TM produces the same chain of events with respect to the second character as was produced by its previous setting with respect to the first character. Thus, the second character is transferred to the register in a second minor cycle, the second character from the preceding block is cleared while the second character of the new block is entering the register, a new TM*e* pulse is produced at the end of the second minor cycle, and F1 to F6 are reset to clear them for reception of the third character from the tape.

The third character marker pulse TM thus will test for presence of the third character in F1 to F6 during the second minor cycle of a next data cycle or cycles. The third character, if present on D1 to D6, will be transferred to the register in a third minor cycle, and a new TM*e* pulse will be produced near the end of this third minor cycle.

In a similar manner, the characters on succeeding lines of the block are transferred to the register. It is to be noted that the new marker pulse always is produced near the end of a minor cycle in which a character is entered and the resulting TM pulse operates to initiate entry of the succeeding character in the relatively next minor cycle of a subsequent data cycle. In other words, the successive characters are entered in the register at intervals of one or more data cycles plus one minor cycle. Since the characters in the register circulate at intervals of a data cycle, it is apparent that when all the characters of a block have been transferred to the register, they follow one another at minor cycle spacing, just as though they had been entered in the consecutive minor cycles of a single data cycle.

Since transfer of a character from the tape to the register cannot occur until a minor cycle after the preceding transferred character has made at least one circulation (in 40 minor cycles) through the data register, the maximum useful data rate from the tape to the reading unit is one line per 41 minor cycles. To avoid the necessity of keeping the data feed rate perfectly constant, the tape may be operated to feed data into the reading unit at a lower rate than the maximum.

The tape continues feeding after all the lines of a block have been transferred and until the next block marker is sensed by the photocell TP (Figure 8*a*). The photocell amplifier ATP applies the block marker signal to the gates 167 and 168. One of these gates is open under control of flip-flops 146 and 147. As explained near the beginning of this section, when a run of the printer was initiated, 146 and 147 were reset. The first D signal produced by the reading of character of the block sets 146 and 147. With 146 set, it shuts gate 168 and opens gate 167. Hence, the block marker signal following transfer of the block operates the gate 167. This gate issues the signal DC which goes to the Central Control (Figure 7) to initiate positioning of the type bands. At the same time, the gate 167 pulses the tube VP, with the result that the coil 48SP is energized and the tape feed stops.

The flip-flop 147 is intended to detect the fact that an empty block has been fed past the reading station and is useful when the printer is conditioned for automatically successive runs. Assuming that a blank tape has not been inadvertently supplied to the printer, the flip-flop 147 will have been set by a D signal when the first block of a succession of blocks read a character into F1 to F6. If an empty block is subsequently fed past the reading station, flip-flop 146, which is reset by the *n*CD signal each time transfer of another block is initiated, will not receive a setting pulse. On the other hand, 147 will be in set state as a result of a signal from a previous block. With 146 off and 147 on, the gate 168 is conditioned to respond to the block marker signal from photocell TP. The tube VP will be pulsed, as before, to cause the stop feed coil 48SP to be energized. But the signal DC will not be produced and the system will be hung up until the start switch BK or TK is again closed.

*Controls for positioning the type bands, etc.*

Line spacing of the sheet W (Figure 1), cocking of the hammers 35, and positioning of the type bands 10 are all initiated by the signal DC produced by the Tape Control unit (Figure 8*a*) when the tape is stopped after the transfer of a block to the data register.

The signal DC goes to a gate 175 in the Central Control (Figure 7). This gate has one input connected to the normal output of a flip-flop 176. Flip-flop 176 is in reset status until a "last-line-of-form" code is sensed on a record block, as will be explained further in a later section. Another input of the gate 175 is connected to the flip-flop SB which was set when a printer run was initiated by pressing the push button switch BK or TK. Assuming a last line of form code has not been sensed, so that 176 is in reset state when the signal DC is applied to the gate 175, the gate is responsive to this signal and via a buffer 178 produces the signals CB, CL and CH.

Line spacing of the paper is obtained from the signal CL. This signal operates a buffer 180 (Figure 10) to apply a triggering pulse to a tube 182. A capacitor 183 discharges through the tube and line spacing magnets LS is energized, bringing the next line of the paper W to printing position. The capacitor 183 charges during off periods of the tube. Magnet LS operates a solenoid which moves a pawl to drive a ratchet wheel on one of the paper feed rolls 31, in order to obtain line spacing in a usual manner.

For cocking the hammers 35 preparatory to printing, signal CH works through a buffer 184 (Figure 11) to trigger a tube 186. A capacitor 187 discharges through the tube and the solenoid HCS (another not shown in this figure is in parallel with the one shown). The solenoids HCS operate to cock the hammers 35 (see Figure 1) by moving the bar **41*a*** as previously explained.

Stopping of the type bands is governed by the signal CB, which goes to the Arrest Control (Figure 8*b*) where it is effective via a buffer 190 to activate an amplifier 191. This amplifier sets a flip-flop 192 and drives a pulse into a delay tank 193. The delay afforded by 193, in the present embodiment, is in the order of some 80 milliseconds or more, and the pulse will not reach an amplifier 194 until sufficient time has elapsed for all the type bands to have been positioned. The amplifier 194 will then operate to reset flip-flop 192 and to send out a positioning complete signal BC.

As explained above, amplifier 191 responded to signal CB and set the flip-flop 192. The normal output *n*191 of amplifier 191 and the driven output *p*192 of 192 are connected to forty similar pairs of band sensing and arresting circuits, one pair for each type band, the pair shown for band #25 being typical.

Upon operation of amplifier 191, it resets the flip-flops 196 in all forty band sensing circuits. When flip-flop 192 in the Arrest Control is set, it is conditioning the gates 197 in all the band sensing circuits. Further, when 192 was set, it activated a buffer 198 to supply a triggering pulse to a tube 199. A forward pulse of current then flowed through the tube, a capacitor CS and the coil 23, for controlling the detent of that type band. Coil 23, in response, released the detent 25 (also see Figure 1) from the associated type band. The coils 23 associated with all the type bands were similarly energized, upon the flip-flop 192 being set, so that the type bands are all released concurrently for rotation.

With the bands in rotation, they arrive at various times at the start counting position. To simplify the explanation, specific consideration for the present will be given to band #25 and Figure 8*b*. Upon the band arriving at start count position, the associated photocells CP and RP respectively sense the hole 10*a* at the leading end of segment 11 and the hole 10*b*. The amplifiers 200 and 201 respond and activate conditioned gate 197 for setting the flip-flop 196. With 196 set, it applies positive potential to an input of a gate 202. Another input of the gate is connected to the driven output of amplifier 200. A third input of the gate connects to the normal output of amplifier 201. As long as photocell RP is on the hole 10*b*, the amplifier 201 shuts the gate 202 so that the signal produced by CP when it is sensing the hole 10*a* at the leading end of segment 11 does not affect the gate 202. This hole 10*a* is thus excluded from entering into the segment count. Subsequent signals by CP, as it senses following holes 10*a*, will be effective since hole 10*b* will then be away from RP and the normal output of 201 will be positive. Each such subsequent signal activates the gate 202 to set a flip-flop 203. This conditions a gate 204 for response to the combination of TF and TC pulses unique to band #25 and the related 25th line or character representation of a record block.

In the preceding section, it was pointed out that the marker pulse TM which initiated entry of the first character of the block into the register was in phase with the TD pulse and, therefore, with the TF1 and TC1 pulse combination. The first character entered the register in the next minor cycle (see Figure 19). Thus, the TF1 and TC1 combination apprehends or marks the approaching minor cycle in which the first character enters the register, and the corresponding minor cycle, within the next data cycle, in which the first character is applied at the output of the register to the "add 1" circuit. Since the successive characters of the block circulate in the register at minor cycle sequence, the TF2 and TC1 pulse combination similarly marks the minor cycle in which the second character enters the "add 1" circuit, the TF3 and TC1 combination is similarly unique to the third character, and so on. Reference to Figure 21 shows that the pulse and circuit combination unique to the 25th character is the combination TF5—TC5 and is produced in the end of the twenty-fourth minor cycle. Since it is desired to position type bands #1 to #40 according to the first to fortieth character representations, respectively, of a block in the register, the TF—TC combinations unique to the locations of the characters of the block are made unique to the locations of the related type bands. In other words, the TF—TC combinations are used to correlate the type bands with the related lines of a block in the register.

To continue with the consideration of band #25 as typical, the gate 204 of band #25 sensing circuit is conditioned by the setting of flip-flop 203 resulting from the sensing of a segment defining hole 10*a* by the photocell CP associated with the band. When the TF5—TC5 combination unique to band #25 finds gate 204 conditioned, it activates the gate to cause an amplifier 205 to drive the A signal through a buffer device 206 common to all the band sensing circuits. The A signal, which occurs at the T7 time preceding the minor cycle in which the 25th character of the block is applied to the "add 1" circuit, is delayed 1¾ by delay line 128 and then sets the augend element AG. AG is thus set ¼ point earlier than the T1 time of the minor cycle in which the 25th character reaches the addend element AD. In the manner previously described, the "add 1" circuit increases the character code by 1 and sends the increased character back to the register for another circulation before the next hole in the band is sensed.

In the same way as explained for band #25, the flip-flops 196 in the other band sensing circuits are set when the respective bands reach the start counting position. The set flip-flop 196 of each band sensing circuit then conditions the connected gate 202 to respond to segment sensing signals by the associated photocell CP. Each such signal operates the gate 202 to set the allied flip-flop 203 which then primes the gate 204 of the particular band sensing circuit for response to the TF—TC combination which is unique to the location of the band and the related line of the block.

During each data cycle, the forty TF—TC combinations sequentially test the respective gates 204 of the forty type band sensing circuits in fixed time relationship to the entries of the corresponding control characters of the block into the "add 1" circuit. If a TF—TC combination finds the gate 204 associated with a band to be open, it means that a segment of the band has been sensed and is ready to be counted by the "add 1" circuit. The TF—TC combination then operates the gate 204 to cause the augend element AG to be set in the approaching minor cycle in which the control character for the band enters the "add 1" circuit. The increase of the control character by 1 is effected and the augmented character sent back to the register. The augend element will be reset by the adding procedure and will be ready for a new setting in the next minor cycle under control of the sensing circuit for the next band.

When the gate 204 in a band sensing circuit is operated by its TF—TC combination, it activates the amplifier 205 to produce the A signal which causes setting of AG. Operation of the amplifier 205 also drives a pulse through a delay line 210 to reset the flip-flop 203 of the band sensing circuit. The delay is long enough to prevent the revolution hole 10*b* from being counted by photocell CP as a segment defining hole 10*a* but is less than a data cycle interval. In the present embodiment, a delay of between 185 to 200 pulse periods is satisfactory. Such delay will cause the sensing of the revolution hole to be merged in the sensing effect of the preceding hole 10*a* but will not permit the TF—TC combination unique to the gate 204 of the band sensing circuit to strike the gate twice for one setting of flip-flop 203.

If desired, the exclusion of the revolution hole 10*b* from the count could be attained in some other way, as by offsetting it laterally from the holes 10*a*, in which case the flip-flop 203 could be reset without delay once the count of a segment had been abstracted from its output gate 204. The flip-flop 203 serves as a memory device to retain the effect of the transient sensing of a segment defining hole until the count of the segment is ready to be transferred to the "add 1" circuit. The time interval between the sensing of one hole $10a$ and the next should therefore be greater than a single data cycle, but preferably not more than two data cycles, inasmuch as 203 is reset after the TF—TC pulse combination has acted on the output gate 204 and before this pulse combination can come around again. In the present embodiment, the time interval between successive hole sensings is appreciably more than a data cycle, thereby avoiding the necessity of maintaining band motion at a constant critical speed and of sensing or spacing the holes $10a$ with precise uniformity. As the sensing interval between segments is greater than a data cycle, the TF—TC combination may not find a gate 204 ready during one data cycle and will then test the gate again in a next data cycle. The gate may be conditioned at a chance time relative to the TF—TC combination. For instance, the pulse combination might just miss the gate being conditioned or it may strike the gate just after it has been conditioned. In any event, the gate will be conditioned long enough to be operated only once for each segment of a band which has passed the sensing position.

As previously explained, when the number of segments of a band which passed the printing position is equal to the difference between 65 and the value of the control character for the band, the desired segment is at printing position. During the positioning procedure, the addition of 1 to the control character for each segment sensed as having passed the printing position takes place in the manner described. Inasmuch as the addition of 1 is called for upon the sensing of a segment defining hole $10a$ at the lagging end of a segment passing the photocell CP of the band and the actual addition may take place at a chance time thereafter, but before the next hole $10a$ is sensed, the last increment of 1 for increasing the value of the control character to 65 might occur at a chance point of the travel of the desired segment across printing position. It is advantageous therefore to stop the count when the controlling character value has been increased to 64 and to operate the band arresting means just as the next segment, which is the one desired, reaches printing position, this fact being manifested by a next hole sensing signal from the band photocell CP. The above arresting procdeure is carried out in the following manner.

The gate 204 of each band sensing circuit is operated by its unique TF—TC combination at the T7 time of a minor cycle preceding the minor cycle in which the control character for the band is entered in the "add 1" circuit. During the latter minor cycle, the control character is increased by 1. If it entered as 111111, the addition of 1 brings the value to 1 000000 (corresponding to 64). As explained in the section on the "add 1" circuit, the 1 in the seventh binary position is manifested by issue of a carry pulse at T7 time of the minor cycle in which the addition is taking place. This carry pulse appears just one minor cycle interval later than the T7 time at which the output gate 204 of the band sensing circuit was operated by its unique TF—TC combination. Hence, the carry pulse is concurrent with the next TF—TC combination which is therefore made unique to the input gate 212 of the band arresting circuit companion to the band sensing circuit. The carry pulse is applied via the T7-clocked gate 138 and amplifier 139 to a bus 213 from which a lead is taken to the gates 212 of all the band arresting circuits. But only the gate 212 of the particular arresting circuit companion to the sensing circuit from which the augend 1 was transferred to the "add 1" circuit to increase a character value to 1 000000 is timed, by its unique TF—TC combination, to respond to the carry pulse.

Considering, for instance, band #25, assume its control character has been augmented to 111111. As a result of the next segment defining hole of band #25 being sensed, gate 204 of sensing circuit #25 will be responsive to its unique TF5—TC5 combination and it the next minor cycle, the addition of 1 to the control character for band #25 will take place. A carry pulse will issue at T7 time of this next minor cycle concurrently with the action of the unique pulse combination TF1—TC6 on gate 212 of band #25 arresting circuit. Only this gate therefore will respond to the carry pulse, to the exclusion of the corresponding gates of the other band arresting circuits.

Upon operation of the gate 212 of a band arresting circuit, it sets a flip-flop 214 to condition a gate 215. When the next segment defining hole of the band is sensed by the photocell CP associated with the band, the resulting signal from the photocell amplifier 200 operates conditioned gate 215. The gate thereupon activates an amplifier 216 which, after a ¾ delay, resets flip-flop 214. As the amplifier operated, it supplied a triggering pulse to a tube 217. The capacitor CS, previously charged up at the time the forward pulse of current was sent through the coil 23 to release the detent 25 (also see Figure 1) from the band, now discharges through the tube 217 and the coil 23 is consequently energized by a reverse current pulse. The coil is thereby effective to cause the detent 25 to be extended into position to arrest the band. As is now clear, the band is arrested with a segment at printing position which corresponds to the controlling character from the line of the record block with which the band is correlated. All the type bands are arrested in this fashion as a result of the positioning procedure.

After adequate time has elapsed for all the bands 10 to be positioned, the pulse which was applied to the delay line 193 (Figure $8b$) by amplifier 191 when the positioning procedure was initiated by signal CB reaches the amplifier 194 and operates it to reset flip-flop 192. At the same time, the amplifier sends out a signal BC to the Central Control (Figure 7).

The signal BC acts on a gate 220 in the Central Control (Figure 7) in order to align the arrested bands for printing. Gate 220 was conditioned by flip-flop SB when a print run was initiated by momentary closure of push button switch BK or TK. Therefore, gate 220 responds to signal BC and emits a signal CA which goes to the Type Band Alignment Control (Figure 12).

In the Alignment Control, the signal CA operates a buffer 222 to supply a triggering pulse to a tube 223. A capacitor 224 thereupon discharges through 223 and energizes the band aligning solenoids ALS. It is understood that while only one solenoid appears in the circuit diagram, another, shown in Figure $2a$, is in parallel with the one shown. Solenoids ALS operate the bail 27 (see Figure 1 and Figure $2a$) to center the selected segments of bands 10 at the printing position. As bail 27 operates, in the last part of its movement it mechanically closes a switch 225 to apply input potential to a buffer 226 in the Hammer Release Control (Figure 13). In response, 226 produces a triggering pulse for a tube 227. A capacitor 228 discharges through the tube and energizes the hammer release solenoid HRS and another (not shown) in parallel. Solenoids HRS retract their plungers 42 (also see Figure 1) to release the latch bar $42a$ from the arms 36 of all the hammers 35. The hammers fire under action of the springs 39 and effect the printing operation. Upon the release of the hammers, one of the plungers 42 mechanically closes a switch 229 (Figure 13) causing a signal RC to be sent out. Signal RC is routed to the input of an amplifier 231 in the Central Control (Figure 7). The amplifier 231 responds and applies a negative pulse to a buffer 233 tending to reset the flip-flop SB. At the same time, amplifier 231 applies a positive pulse to a gate 232.

If the print run was initiated by the start switch BK, the flip-flop SF will be in its reset state, closing the gate 232, so that the positive pulse applied to this gate by amplifier 231 will be ineffective to operate the gate. Hence, resetting of the flip-flop SB will not be prevented, nor will the signals CD and $n$CD recur. Thus, the system will be hung up until a next print run is manually initiated. On the other hand, if the print run was initiated by start switch TK, the flip-flop SF will be in set state and conditioning the gate 232. The positive RC pulse received at the end of the print run by the gate 232 from the amplifier 231 will then be effective to activate this gate. In turn, the gate will be effective via the buffer 140 and the amplifier 141 to produce the signals CD and *n*CD. Signal CD will go to the Data Transfer Control (Figure 8*a*) to initiate transfer of the next block of data from the tape to the register, while signal *n*CD will reset 146 in the Tape Control. Further, with flip-flop SF in set state, it prevents buffer 233 from reacting to the negative signal from amplifier 231, so that flip-flop SB will remain set.

In the above manner, automatically successive print runs can be performed. Cessation of such runs can be effected by momentarily opening a stop key switch SK to withdraw positive potential from the reset input of flip-flop SF, whereupon this flip-flop will reset. The system will then stop at the completion of its current print run just as though the system had been conditioned by switch BK for a single print run.

It may be noted that the switches MD (Figure 8*a*), MB (Figure 8*b*), MC (Figure 10), MH (Figure 11), MA (Figure 12), and MR (Figure 13) are manual test switches for test-operating the individual units.

*Form feed control*

As explained above, the printer ordinarily will print line after line from blocks of information on the record tape, and the paper feeding rolls will be moved through action of the line feed control to a new line each time printing occurs. In some instances it may be desired that successive lines be printed at greater than single line spacing, as for instance when one page of a form or sheet has been completed and a new form is to be started. In such cases a form feed mechanism may be provided, with controls such as shown in Figure 9. The paper feeding rollers are driven by a suitable motor (not shown) which is coupled to and uncoupled from the paper feed rollers by means of any known suitable magnetic clutch or similar mechanism having an actuating coil PDS. When energized by this coil, the clutch connects the driving motor to the paper feed roll, to move the paper. When it is desired to stop the paper feed, as when a new form space has been reached, the drive control coil is deenergized, releasing the drive connection, and a brake actuating coil BS is simultaneously energized to stop the paper feed rolls. The coil BS is used to operate any suitable brake mechanism for the paper drive, as is well known in the art. When not energized, the brake coil releases the brake and the drive coil PDS is allowed to govern movement of the paper.

In order to control the driving and braking coils to start and stop the form feed, an electronically actuated arrangement is preferred. This may be started by a "last line of form" code signal at a proper place on the magnetic tape record, this signal initiating the energization of the drive coil and deenergization of the brake coil to start driving of the paper. When the paper has been fed a desired distance to a new form location, a signal is sent from the paper itself, as by a photosensitive cell FP shown in Figure 9, to again energize the brake coil and deenergize the drive coil to stop the paper feed.

The "last line of form" code signal for starting the form feed is placed on the magnetic tape at any predetermined location desired, probably best at the end of a block of information representing a line of characters to be printed. The particular combination of TF and TC pulses peculiar to the selected signal position will be used to assure operation of the form feed only at the chosen time. Assuming that the form feed control signal is to be located in the last position of a block of information, the combination of TF5 and TC8, which occurs only at the end of the 39th minor cycle, will be used, this combination occurring just before the beginning of the 40th minor cycle, and representing the last character in a line of printed matter. Then, in the 40th position or line on the tape a special code to initiate form feed will be used instead of a code representing a character to be printed. This code will preferably be one which corresponds to a blank segment of the 40th type band so that nothing will be printed in that position. For example, suppose the code 111111 is used, representing the blank segment #63 on the type band.

Referring to the Central Control shown in Figure 7, gate 235 will be conditioned by the particular TF and TC combination selected (in this case TF5 and TC8) so that in the following minor cycle, if the form feed code signal 111111 appears on the D1 to D6 lines from the Tape Reading Unit while a "read" signal R from flip-flop FC in the Input Control is also present at the gate 235, a setting of flip-flop 176 will take place. The positive output from 176 goes to gate 236, and when the tape drive control produces its DC signal at the gate and flip-flop SB is set by previous closing of either switch BK or TK, the coincidence of signals from 176 and SB during the DC signal time causes gate 236 to produce a form feed control signal which is amplified through amplifier 237 and reaches the Form Feed Control unit (Figure 9) as signal CF. The inverse signal *n*CF from amplifier 237 is fed back to flip-flop 176, placing it again in reset state after suitable delay interval.

Signal CF goes through gate 238 (Figure 9) which has been previously conditioned by the normally positive output of the index amplifier 239, and by the closing of "No form" switch 241 as will be later explained. The output of gate 238 will issue through buffer 242 and capacitor 243 to fire the driving thyratron 244 of a thyratron flip-flop circuit, thereby energizing the drive coil PDS to start feed of the paper form. Simultaneously with the firing of tube 244, the braking thyratron 245 is shut off by the connection through the coupling condenser 246, and the brake solenoid is deenergized to release the brake as above described. The paper will thereafter feed until a form indexing mark on the paper is sensed by photocell FP.

The paper indexing arrangement may be similar to that used in automatic wrapping machinery or the like, and depends for its action upon an abrupt change in the amount of light reaching index photocell FP. Normally there are no effective changes in the light reaching the cell. However, at the beginning of a predetermined space on the paper denoting a new form, a black "index" mark on the paper, which may be similar to that used to separate blocks of information on the magnetic tape, may be used to interrupt reflected light received by the photocell from a suitable source. In this case the photocell has a normally negative light-produced output which will change to positive upon the interruption of light directed toward it. If it is desired to use an index photocell of the type having a positive light-produced output which changes to negative when light reaching it is interrupted, then the form index mark may be a hole or transparent section in the paper at a predetermined point so that light will reach the photocell through the paper web only when an index hole is between the light source and the cell. In either case, while the paper is being moved between index positions, the output from photocell FP will be negative, and the normal output *n*239 of amplifier 239 will therefore be positive, the reverse of its input from the photocell. The driven output of this amplifier is not used here. When an index marker on the paper passing the photocell changes the condition of light reaching the cell, the cell output will become positive and the normal amplifier output will become negative.

This negative amplifier output will have no effect itself on the form feed control circuit, but when the index mark has passed the photocell and the photocell again resumes its negative output, a positive signal will be produced again by the amplifier. This new positive signal will be sent through capacitor 247 as a PC signal back to gate 248 of the Central Control. Normally the PC signal is occurring during set condition of flip-flop SB and permits actuation of the controls for line feed, hammer cocking, band arresting, band alignment and hammer release as above described. At the same time, this restored positive signal *n*239 from the amplifier 239 will pass through buffer 249 and capacitor 251 to fire the brake thyratron 245, energizing the brake solenoid. The firing of the brake thyratron also shuts off the drive thyratron 244 through the coupling condenser, and de-energizes the drive solenoid.

This is the condition of the form feed control the majority of the time, when the paper is between the form index markings. The index photocell is so positioned relative to the paper web and the paper is driven at such a speed that the paper will stop one line above the first line to be imprinted, after the index marker has signalled the form feed to stop.

In order to start the form feed at any time manually, a switch MF1 is provided, with a positive source, and when this switch is closed a positive signal will be imposed through buffer 242 to fire the drive thyratron 244. Manual stopping of the form feed can also be obtained by closing switch MF2 to apply a positive signal to buffer 249, firing the brake thyratron 245.

If the reel or roll supplying printing paper to the machine should become exhausted, the printer should be stopped. For this purpose, the "No form" switch 241 is provided. This switch leads to the gate 238 so that if a CF signal is received by the form feed control when the switch is open, there will be no gating of the signal and the drive thyratron will not be fired. The switch may be actuated manually if desired, but preferably it is automatically opened by any known physically sensitive mechansm whenever the absence of a further supply of paper is physically sensed. Pressure operated, weight operated, light operated and similar sensing mechanisms for this purpose are well known and need not be described other than to note that as long as paper for a succeeding form is present, the switch 241 will remain closed, and that the switch will open automatically only when paper is exhausted.

It should be noted that a signal CL is sent to the line feed control from gate 248 and buffer 178 when the PC signal from the Form Feed Control occurs during a signal from flip-flop SB. This restores control of the paper feed to the Line Feed Control after a Form Feed operation.

*Complete printing cycle*

A complete cycle of the printer may be assumed to start when the magnetic tape, the type bands, and the paper are all stationary, following a previous printing operation. A "start" signal is sent to the machine either manually by closing the push button BK, or automatically by the control pulse DF following the closing of push button TK in a previous cycle. Then the sequence of operations will be:

1. In response to the start signal, the tape control unit initiates movement of the magnetic tape for a space of one block containing 40 lines. While the tape is moving, the tape reading unit "reads" the forty lines of information from the block.

2. As the information is read in parallel line by line from the tape, it is entered serially in the recirculating data register, in proper position as determined by the marker line, and in timed spacing as determined by the pulses T0 to T7.

3. The block marker line TS on the tape then initiates a DC signal through photocell TP, and the tape control unit stops the tape after all 40 coded lines of a block have been read, but before any of the information lines of the following block are read.

4. The DC signal results in a CB signal going to the arrest control, and this then retracts all of the type band detents simultaneously so that the type band drive will be effective to rotate all the type bands.

5. Simultaneously with the CB signal, the signal CL will initiate movement of the paper one line space by the line feed control, and the signal CH will actuate the solenoids HCS to cock all the printing hammers in unison.

6. When a "last line of form" code is read from the magnetic tape, the form feed control rather than the line feed control will be effective to move the paper at this general time in the cycle of operation.

7. Following release of the type bands (step 4 above), as each band moves and reaches its "start counting" position, determined by its hole 10*b* passing the photocell RP, the electronic counting procedure will start for that band in the "add 1" circuit.

8. Thereafter, as the information in the data register circulates, each time that a segment hole 10*a* on a type band passes its corresponding photocell CP, a counting pulse is produced and that pulse is added by the "add 1" circuit to the symbol in the data register position for that band, until the six places in that band position in the data register are full. The following circulation of that symbol in the register, when combined with another segment-counting pulse, will cause an "overflow" or carry pulse in the seventh place, thereby sending a signal from the "add 1" circuit, properly timed by a particular combination of TF and TC pulses so that it goes to the band arresting unit for that band.

9. This seventh place or overflow pulse to the band arresting unit will operate to extend the detent and stop the selected type band with the proper character generally opposite the printing station. This segment counting and band arresting continues in similar fashion until all of the type bands have been allowed time to stop by virtue of the delay 193 in the arrest control unit.

10. After the delay imposed by line 193, the signal BC is issued from the arrest control, and this signal produces the impulse which causes the solenoids ALS to align the characters on the arrested type bands accurately opposite the printing station, by engagement of the bail bar 27*a* with all of the extended detents.

11. The last part of movement of the type-aligning bail closes switch 225 and thereby sends an impulse to fire thyratron 227, which actuates the solenoids HRS and releases the printing hammers, printing an entire line of 40 characters at one time.

12. After printing, the type alignment bail is retracted from the detents, but the detents remain in engagement with the holes in the type bands until released in a succeeding cycle preparatory to setting the next line of type.

The paper feeding and hammer cocking operations obviously might be arranged to fall in some other part or parts of the cycle, as long as they are not so close in time to the printing operation as to interfere with it. For similar reasons, the release of the detents might be arranged to take place at any convenient time after printing but before a following transfer of the information from the data register to the printing bands.

What is claimed is:

1. A printing machine comprising a supporting cylinder, a type ring closely encircling the cylinder and rotatable thereon, said ring having a multiplicity of regularly spaced holes therein dividing the perimeter of said ring into equal segments, a font of type characters on the outside of said ring on the segments between the holes, a printing station adjacent said ring at a fixed location, a drive normally rotating said ring around said cylinder in a single direction past said printing station, a movable detent extensible into the path of movement of said spaced holes in the ring and engageable with a selected one of said holes, said detent thereby arresting movement of said ring at a chosen segment with a particular type character approximately opposite the printing station, resilient means cushioning the detent upon its engagement with said hole and arresting of the ring, a locating member engaging the extended detent and movable to align the arrested type more precisely opposite the printing station, a printing hammer at said printing station movable toward and away from the ring and the cylinder, means moving said hammer toward the ring and cylinder for printing when a chosen type is aligned at the printing station, means moving said hammer away from said ring and cylinder after printing, and means retracting said detent from engagement with said hole after printing, thereby restoring said ring to normal rotation.

2. A high speed printing machine comprising a supporting cylinder, an endless flexible type band of relatively small mass closely encircling the cylinder and rotatable thereon, a multiplicity of regularly spaced stop shoulders on said band dividing the perimeter of said band into equal segments, a font of type characters on the outside of said band with the characters on the segments between the stop shoulders, a printing station adjacent said band at a fixed location with respect to said cylinder, a drive normally rotating said band rapidly around the axis of said cylinder in a single direction past said printing station, a detent in said cylinder extensible radially outwardly into the path of movement of said spaced stop shoulders on the rotating band and selectively engageable with one of said shoulders, said detent thereby arresting movement of said band at a chosen segment with a particular type character generally opposite the printing station, a spring bearing on said detent for resiliently limiting arcuate movement of the detent upon its engagement with a selected shoulder, a swinging bail engaging the extended detent and movable to align the arrested type precisely at the printing station before printing, a printing hammer at said printing station movable toward and away from the band and the cylinder, a spring normally biasing said hammer toward the band and cylinder for printing, a latch restraining spring movement of the hammer by engagement therewith until the type is arrested and aligned, means moving said hammer against the spring bias away from said band and cylinder and into engagement with said latch after printing, and means retracting said detent from engagement with said stop shoulder after printing, thereby restoring said band to normal rotation by said drive.

3. A high speed printing machine comprising a horizontal supporting cylinder with a polished outer bearing surface, an endless flexible type band of relatively small mass closely encircling the cylinder and rotatable thereon, a multiplicity of regularly spaced stop shoulders on said band dividing the perimeter of said band into equal segments, a font of type characters on the outside of said band with the characters on the segments between the stop shoulders, a printing station adjacent said band at a fixed location with respect to said cylinder, a friction drive normally rotating said band rapidly around the axis of said cylinder in a single direction past said printing station, a magnetically operated detent in said cylinder extensible radially outwardly into the path of movement of said spaced stop shoulders on the rotating band and selectively engageable with one of said shoulders, said detent thereby arresting movement of said band at a chosen segment with a particular type character generally opposite the printing station, a spring extending between said detent and said cylinder for resiliently limiting arcuate movement of the detent upon its engagement with the selected shoulder, a magnetically operated swinging bail engaging the extended detent and arcuately movable to align the arrested type precisely at the printing station before printing, a printing hammer at said printing station movable radially toward and away from the band and the cylinder, a spring normally biasing said hammer toward the band and cylinder for printing, a latch engageable with and restraining movement of the hammer, magnetic means releasing said latch and allowing said spring to move said hammer when the type is arrested and aligned, magnetically operated means moving said hammer against the spring bias away from said band and cylinder and into engagement with said latch after printing, and magnetically operated means retracting said detent from engagement with said stop shoulder after printing, thereby restoring said band to normal rotation by said friction drive.

4. A line printer comprising a supporting cylinder, a plurality of type rings adjacent each other along the cylinder, closely encircling the cylinder and each rotatable thereon independently of the other rings, each of said rings having a multiplicity of regularly spaced holes therein dividing the perimeter of said ring into equal segments, a font of type characters on the outside of each ring on the segments between the holes, a printing station adjacent the cylinder at a fixed line position transverse to the paths of rotation of the rings, a drive normally rotating said rings around said cylinder in a single direction past the line of said printing station, a plurality of movable detents, each detent extensible into the path of movement of the spaced holes in a single type ring and engageable with a selected one of said holes, said detents thereby arresting movement of said rings at chosen segments with a series of particular type characters approximately opposite the printing station line, resilient means cushioning the detents upon their engagement with the holes and arresting of the rings, a single locating member engaging all the extended detents and movable to align the arrested type with each other and more precisely opposite the printing station, a plurality of separate printing hammers, one for each type ring, aligned across said printing station and movable simultaneously toward said type rings and said cylinder when all the rings have been stopped and aligned with a chosen line of characters to be printed, means moving said hammers away from said rings and cylinder after printing, and means retracting said detents from engagement with said rings after printing, thereby restoring said rings to normal rotation on said cylinder.

5. A high speed line printer comprising a stationary supporting cylinder, a plurality of endless flexible type bands of relatively small mass closely encircling the cylinder and independently rotatable thereon adjacent each other, a multiplicity of regularly spaced stop shoulders on each of said bands dividing the perimeter of each band into equal segments, a font of type characters on the outside of each band with the characters on the segments between the stop shoulders, a printing station adjacent said cylinder at a fixed line location transverse to the paths of rotation of the bands, a drive normally rotating said bands rapidly around the axis of said cylinder in a single direction past the line of said printing station, a plurality of detents in said cylinder, each detent extensible radially outward into the path of movement of the spaced stop shoulders on a single rotating band and selectively engageable with one of said shoulders, said extended detents thereby arresting movement of said bands at chosen segments with a series of particular type characters generally opposite the printing station line, a spring bearing on each detent for resiliently limiting arcuate movement of said detent upon its engagement with a selected shoulder, a swinging bail engaging all the extended detents and movable to align the arrested type characters with each other precisely opposite the printing station before printing, printing hammers at said printing station movable toward and away from the bands and the cylinder, springs normally biasing said hammers toward the bands and cylinder for printing, a single latch restraining spring movement of all the hammers by engagement therewith until the type bands are all arrested and aligned, a single means moving all said hammers against the spring bias, away from said bands and cylinder and into engagement with said latch, and means retracting said detents from engagement with said stop shoulders after printing, thereby restoring said bands to normal rotation by said drive.

6. A high speed line printer, comprising a plurality of type-carrying bands mounted closely adjacent each other, a set of spaced type blocks on each band, each band having a series of holes therein, each hole being in the space between type blocks, a drive normally rotating said bands together in a single direction, a detent for each band engageable with an edge of one of the holes to stop the driving of that band, a printing station opposite the paths of rotation of said bands, a counter detecting movement of each hole on each band past a given point, a signal record indicating the particular chosen type block to be printed from each band, said counter progressively adding to the signal for each band as each hole passes the counting point until a predetermined total is reached, and means responsive to the reaching of said predetermined total for actuating the detent for each band, whereby each band is stopped with a chosen type block at the printing station.

7. A high speed line printer, comprising an elongated support, a polished outer surface on said support, a multiplicity of type-carrying bands mounted closely adjacent each other on said support, a set of spaced type blocks on each band, each band having a series of holes therein between type blocks, a drive normally rotating said bands in a single direction around the support, a detent for each band engageable with an edge of one of the holes to stop the driving of that band with the type blocks in a chosen position, a printing station in a line opposite the paths of rotation of all said bands, a counter for each band, each counter including a light source directed toward the band and the support, a photoelectric cell positioned to receive light reflected from the polished surface of the support whenever a hole in the band passes the light source, said cell thereby detecting movement of each hole on the band past a given point, a signal record indicating a particular chosen type block to be printed from each band, an adding circuit actuated by each photocell and progressively adding to the signal record for each band as each hole passes the light source until a predetermined total is reached, and means responsive to the reaching of said predetermined total for actuating the detent for each band, whereby each band is stopped with a chosen type block at the printing station.

8. A machine for printing at high speed a line of characters at a time, comprising a stationary cylindrical support, a polished outer surface on said support, a multiplicity of type-carrying bands mounted closely adjacent each other and rotatably slidable around said support; a set of spaced type character blocks on each band, each band having a series of holes therein between type blocks, a line printing station opposite the axis of the cylindrical support, a friction drive normally rotating said bands in a single direction around the cylindrical support past the printing station, a detent for each band movable to engage an edge of one of the holes, whereby the friction drive will slip and the bands will be stopped with the type blocks in chosen positions opposite the printing station, a solenoid for moving each detent, a counter for each band, each counter including a light source directed toward the band and the polished surface of the support, a photoelectric cell positioned to receive light from the source reflected from the polished surface whenever a hole in the band passes the light source, a counting circuit from each cell producing a counting pulse each time the cell is energized by a hole passing the light source, a binary coded signal pulse record for each band indicating a particular chosen type block to be printed from that band, an adding circuit adding a counting pulse from the photocell counting circuit to the signal pulse record for each band as a hole passes the light source until a binary carry-over pulse occurs from the augmented signal record beyond a predetermined position, and a band arresting circuit to each detent solenoid actuated by the carry-over pulse for moving the solenoid and detent for each band, whereby each band is stopped with a chosen type block character at the printing station.

9. A printing machine comprising a backing member, an annular type carrier rotatably mounted on said member, a multiplicity of regularly spaced stop shoulders on said carrier dividing the perimeter of the carrier into segments, individual type characters on the segments between the shoulders, a printing station adjacent said carrier at a fixed location, a drive frictionally engaging said carrier and normally continually rotating it around said backing member in a single direction past said printing station, a reciprocating detent at one extreme of its travel being extensible into the path of movement of said stop shoulders on said carrier, mechanism timing the operation of said detent to engage a selected stop shoulder, said detent thereby selectively arresting rotation of said carrier at a chosen segment with a particular type character approximately next to the printing station, an aligning bar engaging the extended detent, said detent being movable thereby to position the arrested carrier and particular type character more precisely at the printing station, and a printing hammer at said printing station movable toward said arrested and aligned type character for printing the chosen type character in a precise position at the printing station.

10. A high speed line printer comprising a hollow supporting cylinder, a plurality of annular type carriers encircling the cylinder and rotatable thereon in paths adjacent each other, each carrier having a multiplicity of regularly spaced stop holes therein dividing the perimeter of the carrier into equal segments, a font of type characters on the outside of each carrier with an individual character on each segment, a printing station adjacent the cylinder at a fixed line position transverse to the paths of rotation of said type carriers, a drive frictionally engaging said carriers and normally continually rotating them in unison around said cylinder in a single direction past said printing station, a plurality of reciprocating detents, one for each type carrier, mounted within said cylinder, each detent at one extreme of its travel being extensible into the path of movement of the stop holes in one of said carriers, mechanism timing the operation of each detent to engage a selected stop hole in each carrier, said detents thereby selectively arresting rotation of the carriers at chosen segments with a plurality of particular type characters approximately in a single line next to the printing station, an aligning bail swingably engageable with all the extended detents, said detents being movable thereby to locate all the arrested carriers and particular type characters simultaneously in accurate alignment with each other precisely at the printing station, and a plurality of individual printing hammers, one for each type carrier, arranged across said printing station and movable simultaneously toward said arrested and aligned type characters for printing the particular type characters in unison in an accurate single line at a precise position at the printing station.

References Cited in the file of this patent

UNITED STATES PATENTS

| | | |
|---|---|---|
| 570,264 | Otteson | Oct. 27, 1896 |
| 798,460 | Scotford | Aug. 29, 1905 |
| 931,170 | Wilhelm | Aug. 17, 1909 |
| 979,585 | Sokolov | Dec. 27, 1910 |
| 1,158,545 | Ocumpaugh | Nov. 2, 1915 |
| 1,183,529 | Brasseur | May 16, 1916 |
| 1,643,349 | Sanders | Sept. 27, 1927 |
| 2,041,943 | McCain | May 26, 1936 |
| 2,101,444 | Miles | Dec. 7, 1937 |
| 2,116,609 | Shomaker | May 10, 1938 |
| 2,157,035 | Torkelson | May 2, 1939 |
| 2,175,530 | Knutsen | Oct. 10, 1939 |
| 2,448,781 | Daly | Sept. 7, 1948 |
| 2,627,807 | Buhler | Feb. 10, 1953 |